United States Patent
Kim

(10) Patent No.: US 10,979,904 B2
(45) Date of Patent: Apr. 13, 2021

(54) METHOD FOR SECURING CONNECTION IDENTIFIER OF USER EQUIPMENT IN WIRELESS COMMUNICATION SYSTEM AND APPARATUS THEREFOR

(71) Applicant: LG ELECTRONICS INC., Seoul (KR)

(72) Inventor: Joonwoong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/611,424

(22) PCT Filed: May 8, 2018

(86) PCT No.: PCT/KR2018/005275
§ 371 (c)(1),
(2) Date: Nov. 6, 2019

(87) PCT Pub. No.: WO2018/208062
PCT Pub. Date: Nov. 15, 2018

(65) Prior Publication Data
US 2020/0169877 A1    May 28, 2020

Related U.S. Application Data

(60) Provisional application No. 62/502,788, filed on May 8, 2017.

(51) Int. Cl.
| | |
|---|---|
| *H04W 8/04* | (2009.01) |
| *H04W 12/06* | (2021.01) |
| *H04W 4/44* | (2018.01) |
| *H04W 12/04* | (2021.01) |
| *H04W 8/20* | (2009.01) |
| *H04W 12/08* | (2021.01) |

(52) U.S. Cl.
CPC ............. *H04W 12/06* (2013.01); *H04W 4/44* (2018.02); *H04W 8/04* (2013.01); *H04W 8/20* (2013.01);
(Continued)

(58) Field of Classification Search
CPC ..... H04W 12/06; H04W 12/08; H04W 12/04; H04W 4/40; H04W 4/44
See application file for complete search history.

(56) References Cited

U.S. PATENT DOCUMENTS 8,347,090 B2 * 1/2013 Holtmanns ............... H04L 9/32
713/168
2014/0169269 A1 6/2014 Salot et al.
(Continued)

FOREIGN PATENT DOCUMENTS

KR    1020150006332    1/2015

OTHER PUBLICATIONS

"3GPP; Technical Specification Group Sercie and System Aspects; Study on Security Aspects for LTE Support of V2X Services (Release 14)," 3GPP TR 33.885 V1.1.0, Feb. 27, 2017, see sections 6.3.1, 6.3.2, 6.9.2.1, 6.9.2.2.2.
(Continued)

*Primary Examiner* — Michael T Vu
(74) *Attorney, Agent, or Firm* — Dentons US LLP

(57) ABSTRACT

A method for securing an identifier of a user equipment used when connecting to a network connection in a wireless communication system, according to an embodiment of the present invention, may comprise the steps of: receiving, from the user equipment, a message requesting a first ticket for authenticating a right to access the identifier in a serving network of the user equipment, wherein the message includes information on a second ticket for authenticating a right to access the identifier in a home network of the user
(Continued)

equipment; transmitting the information on the second ticket to a mobility management entity (MME) of the home network; receiving, from the MME of the home network, identification information of the user equipment that is determined on the basis of the information on the second ticket; and transmitting, to the terminal, information on the first ticket and a temporary key used to encrypt the identifier in the serving network, on the basis of the identification information.

13 Claims, 15 Drawing Sheets

(52) U.S. Cl.
CPC . *H04W 12/04031* (2019.01); *H04W 12/0609* (2019.01); *H04W 12/0808* (2019.01)

(56) References Cited

U.S. PATENT DOCUMENTS

| | | | |
|---|---|---|---|
| 2015/0319665 A1* | 11/2015 | Bonneville | H04W 36/24 |
| | | | 455/411 |
| 2016/0029215 A1* | 1/2016 | Jung | H04W 12/02 |
| | | | 713/168 |
| 2016/0262015 A1 | 9/2016 | Lee et al. | |
| 2018/0376329 A1* | 12/2018 | Gapastione | H04W 12/06 |

OTHER PUBLICATIONS

Qualcomm Incorporated, "PCR to Update Solution #7.4; Privacy Enhanced Mobile Subscriber Identifier (PMSI)," S3-170293, 3GPP TSG SA WG3 Meeting #86, Sophia Antipolis, France, Jan. 30, 2017, see section 4.

"3rd Generation Partnership Project; Technical Specification Group Services and System Aspects; Study on security aspects for LTE support of V2X services (Release 14)", 3GPP TR 33.885 V1.2.0 (Mar. 19, 2017), XP051283010.

"3rd Generation Partnership Project; Technical Specification Group Services and System Aspects; Study on security aspects for LTE support of Vehicle-to-Everything (V2X) services (Release 14)", 3GPP TR 33.885 V.14.1.0 (Sep. 21, 2017)), pp. 1-75, XP051337098.

* cited by examiner

[FIG.1]
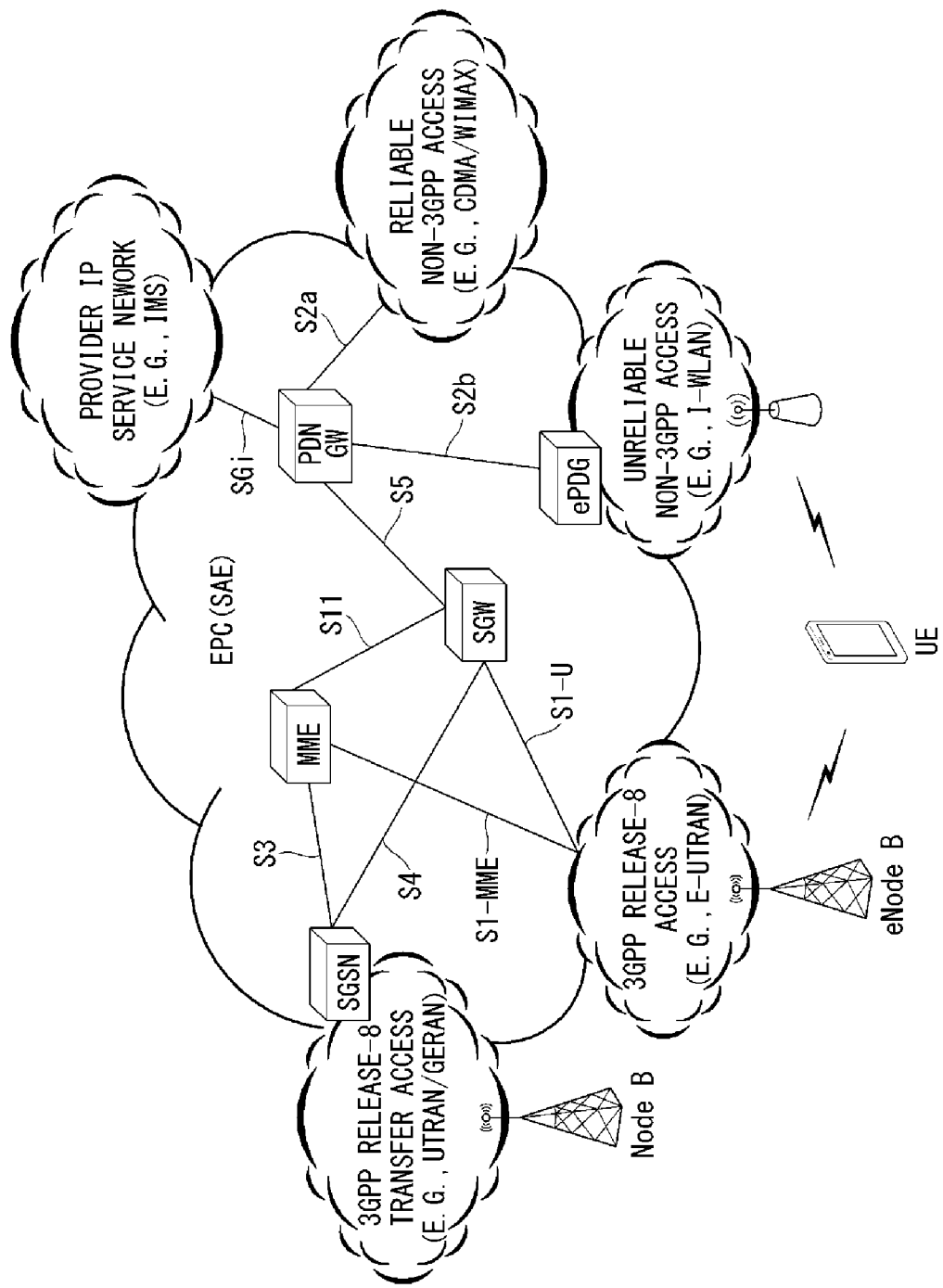

[FIG.2]
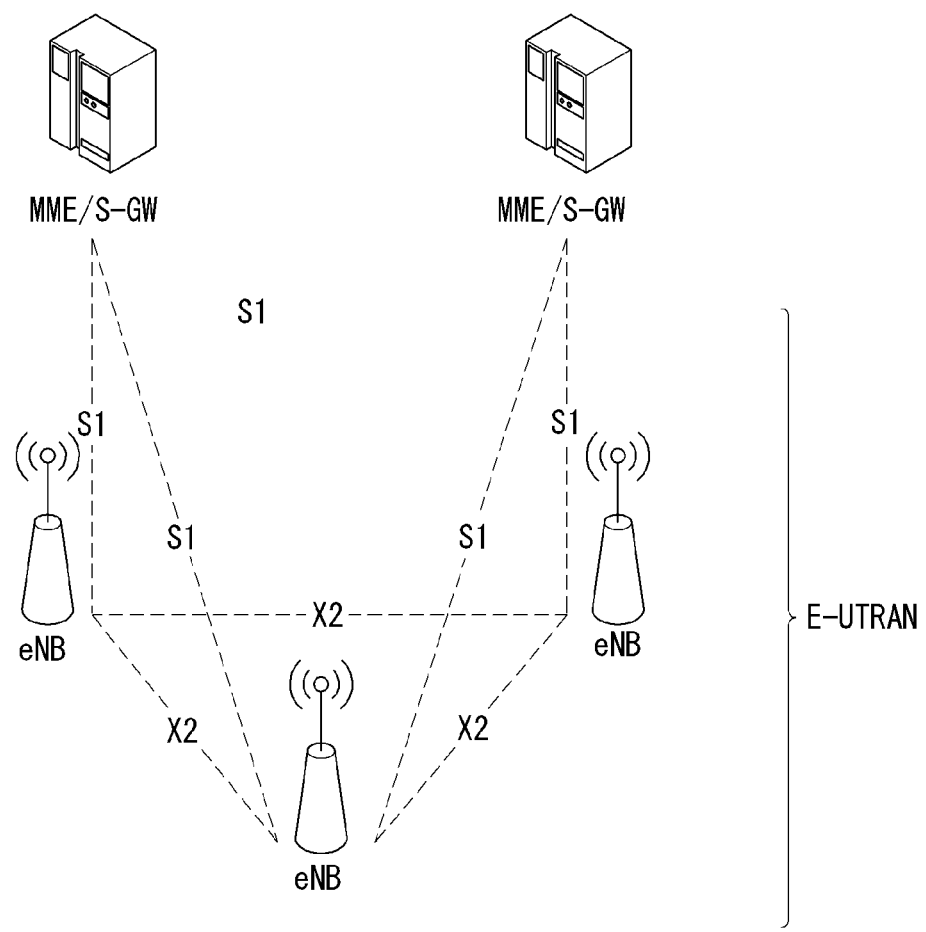

[FIG.3]
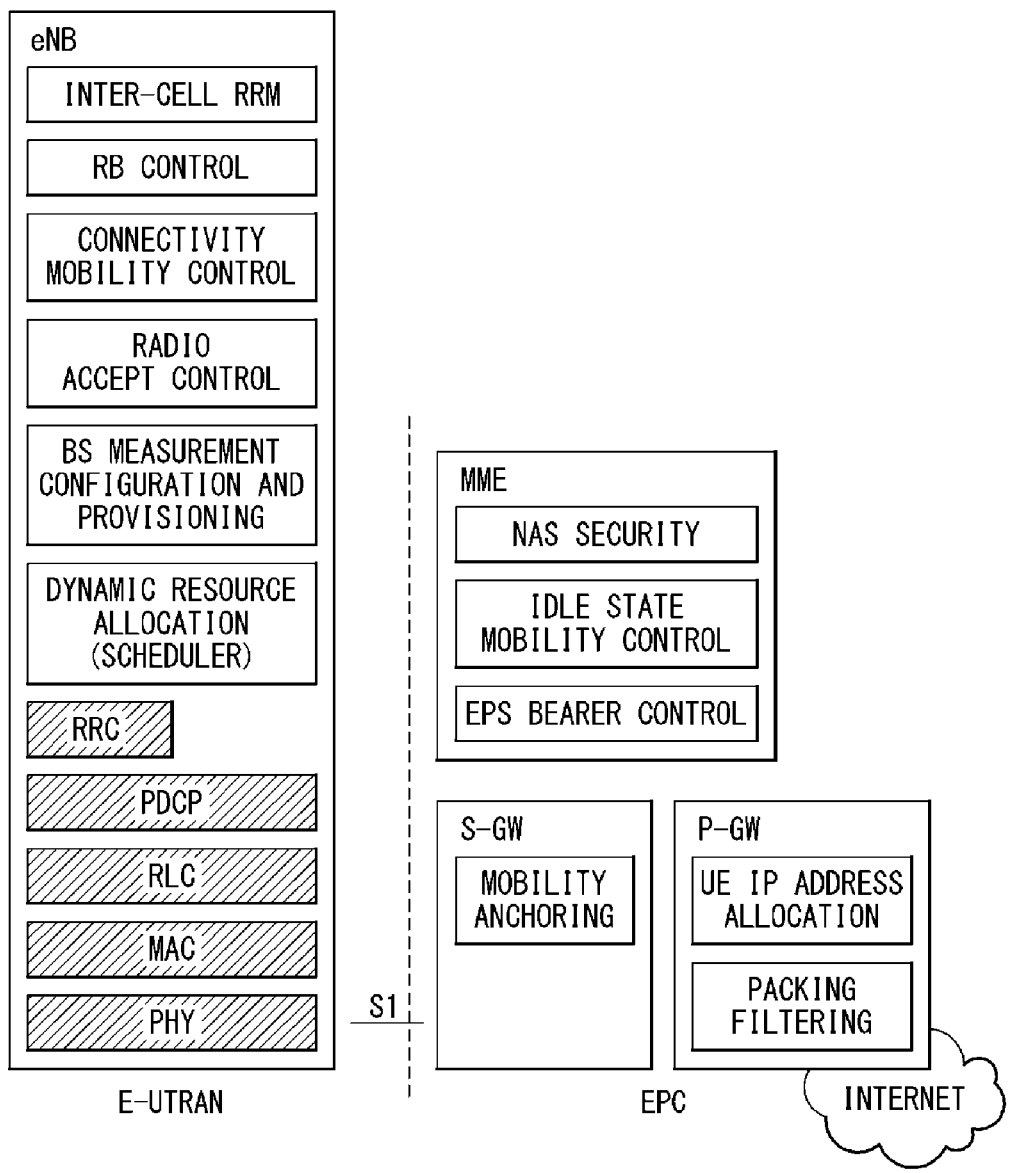

[FIG.4]
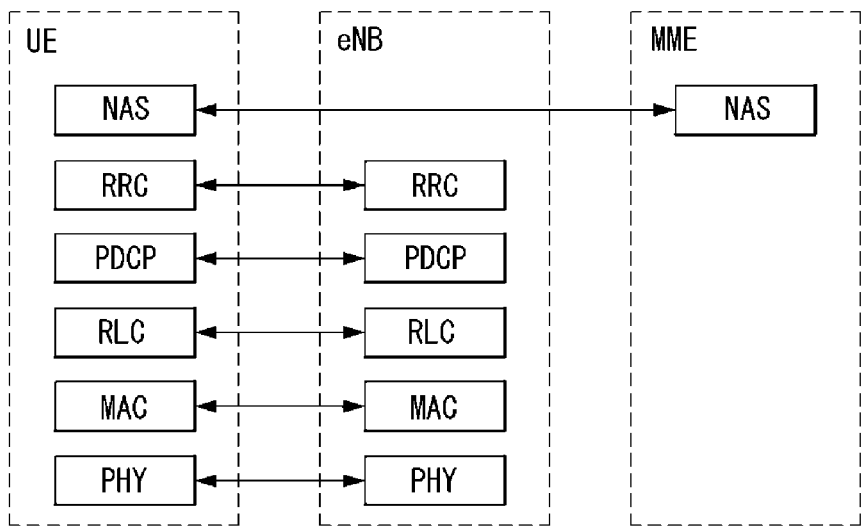
(a) CONTROL PLANE PROTOCOL STACK
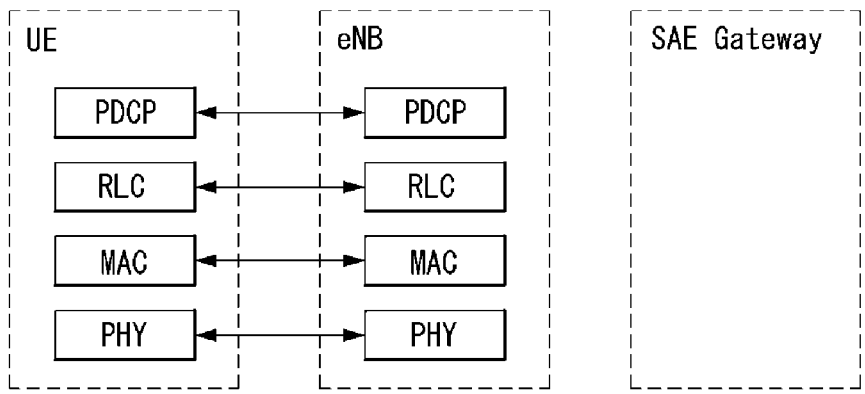
(b) USER PLANE PROTOCOL STACK
[FIG.5]
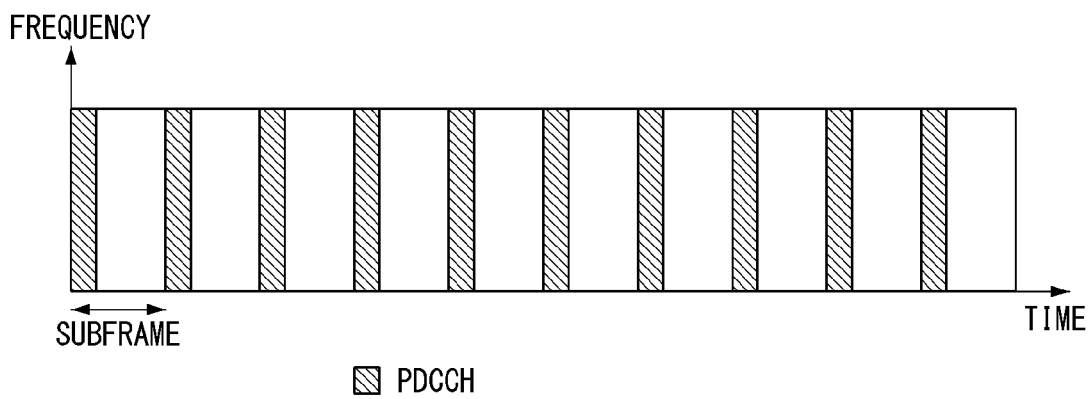

[FIG.6]
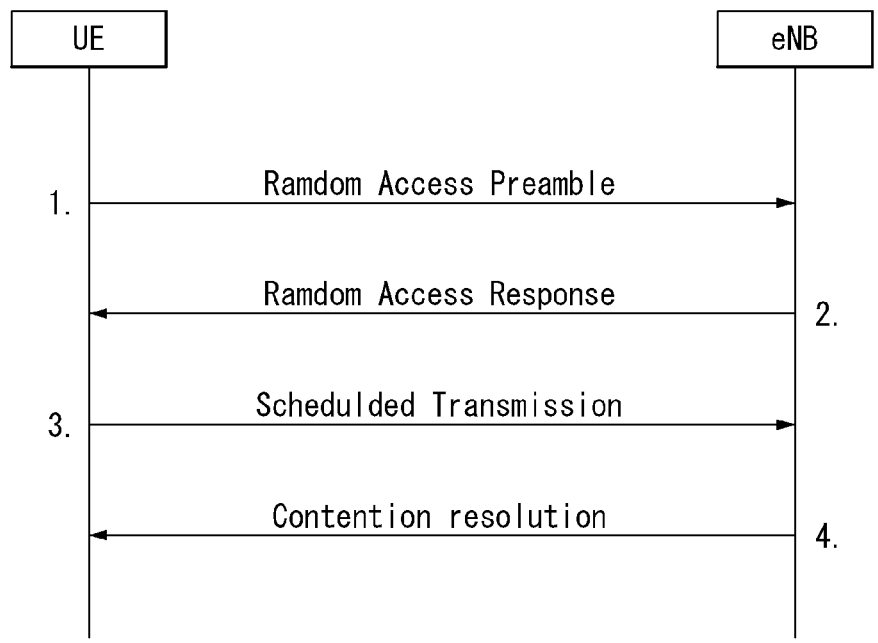

[FIG.7]
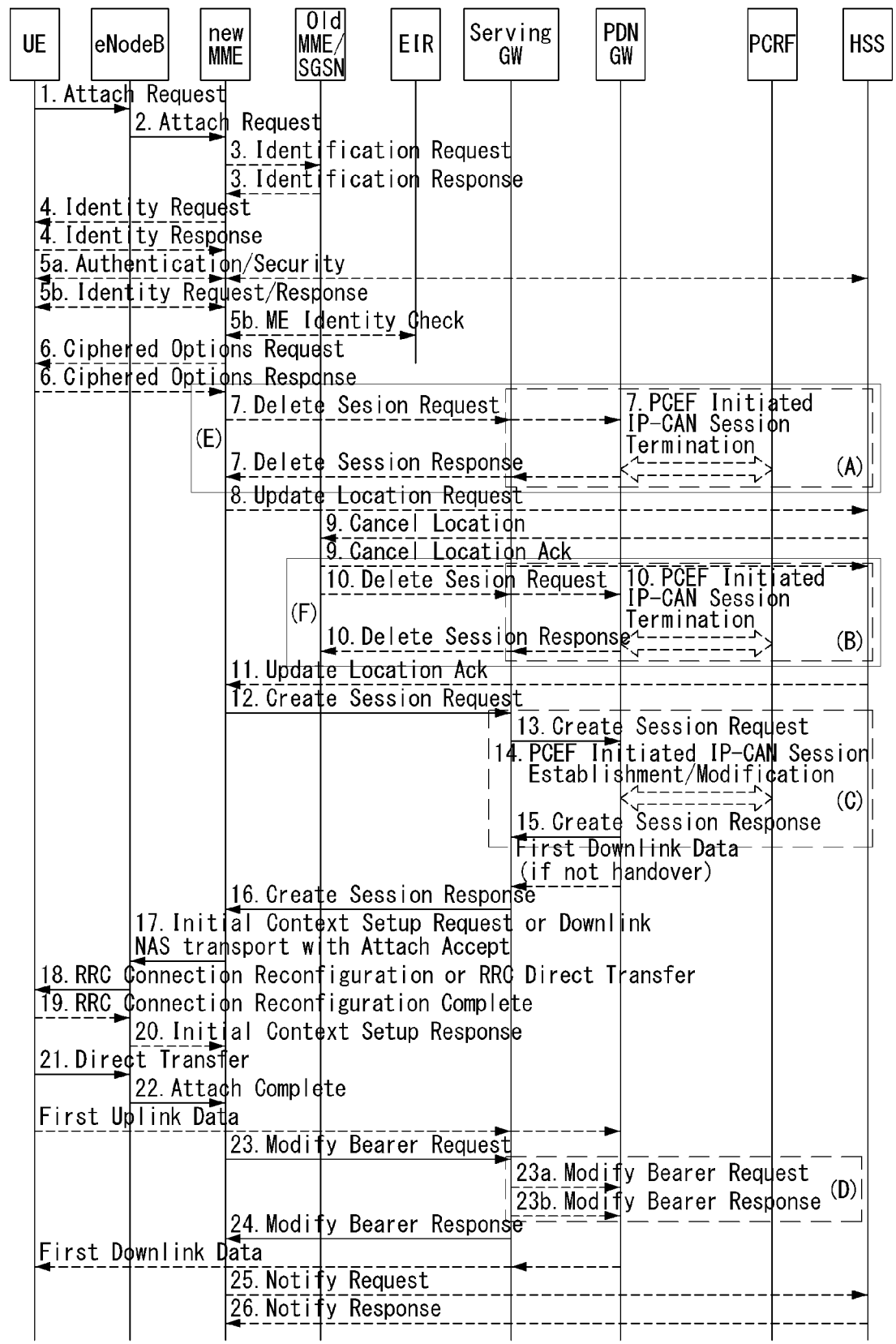

[FIG.8]
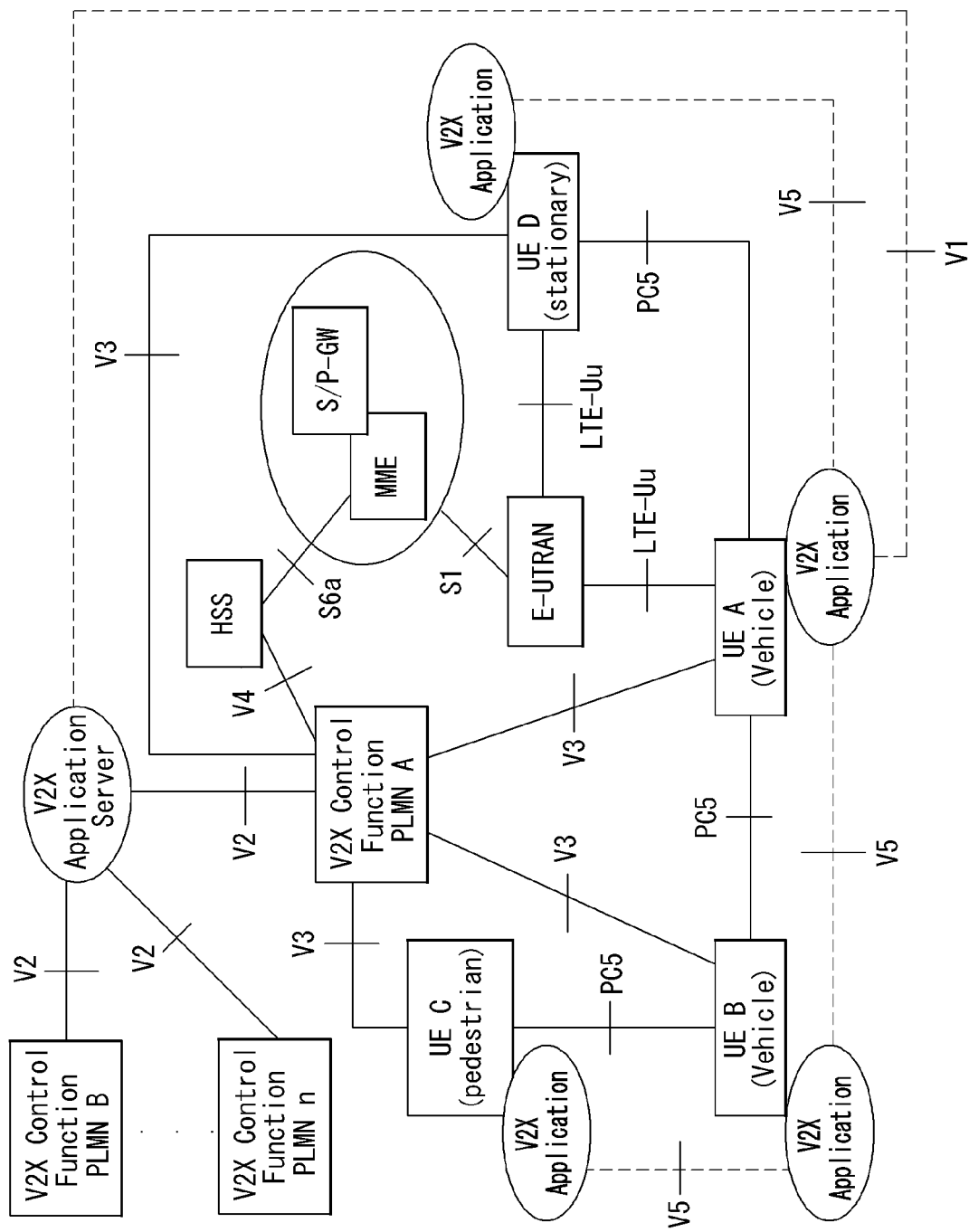

[FIG.9]
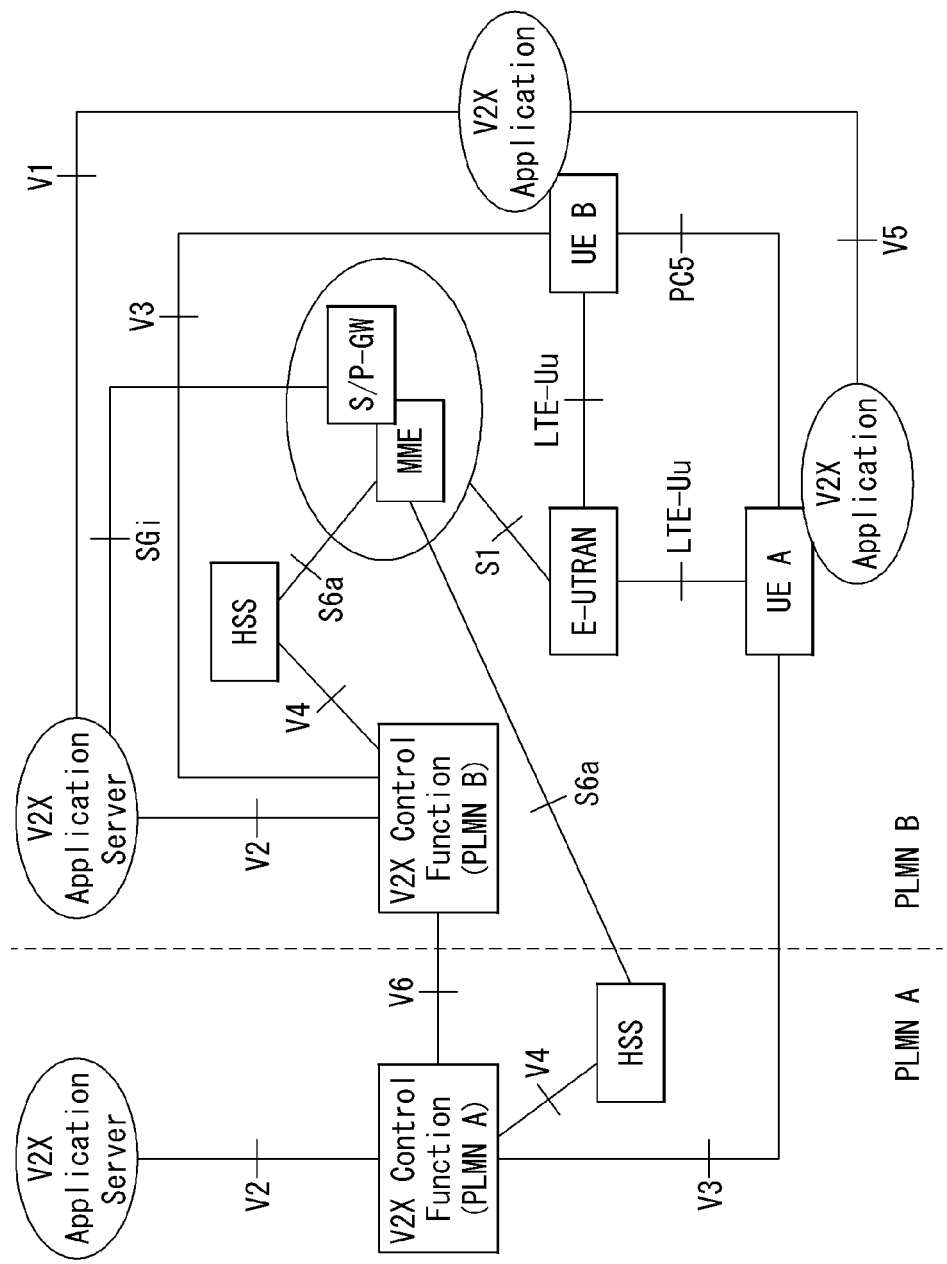

[FIG.10]
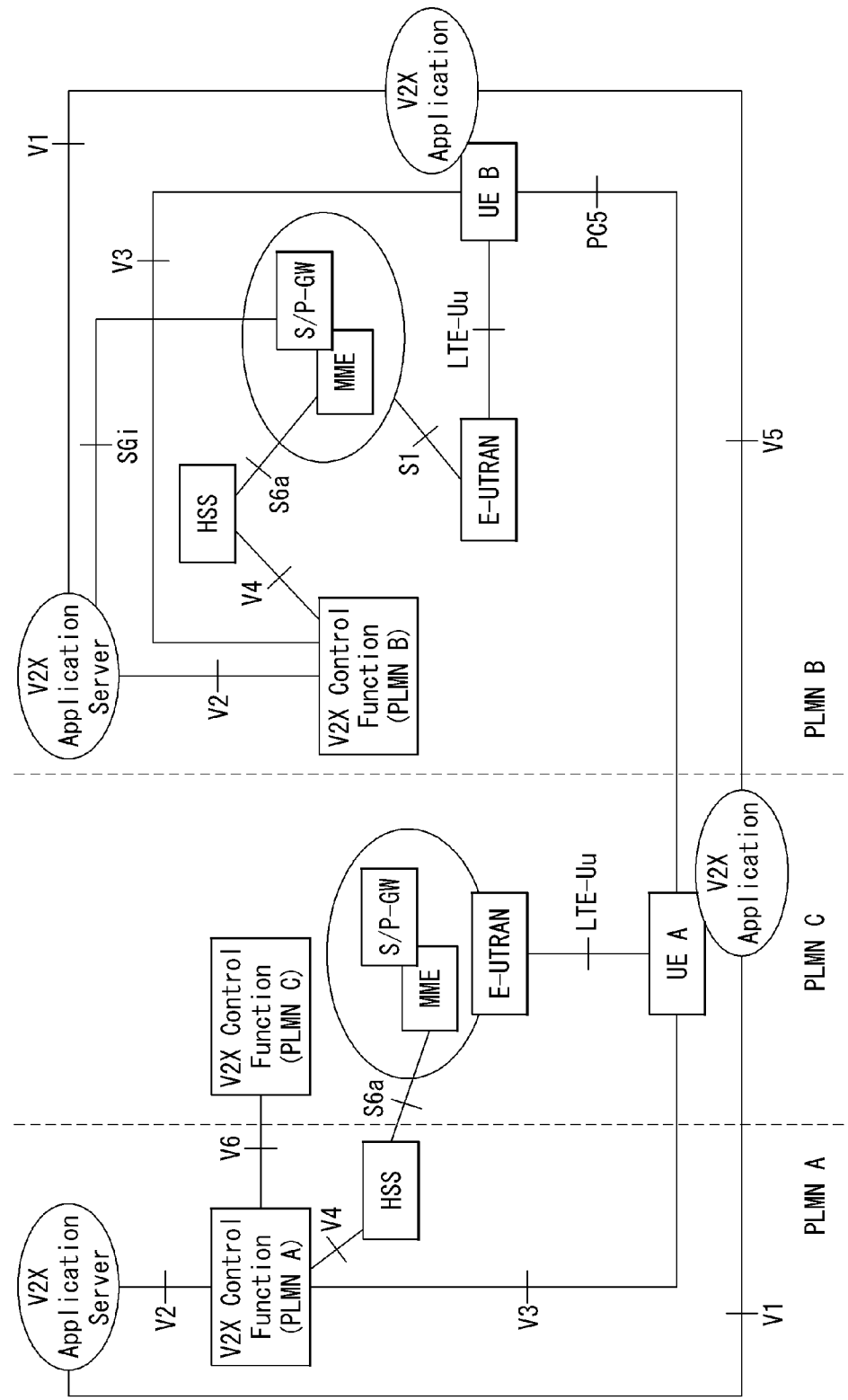

[FIG.11]
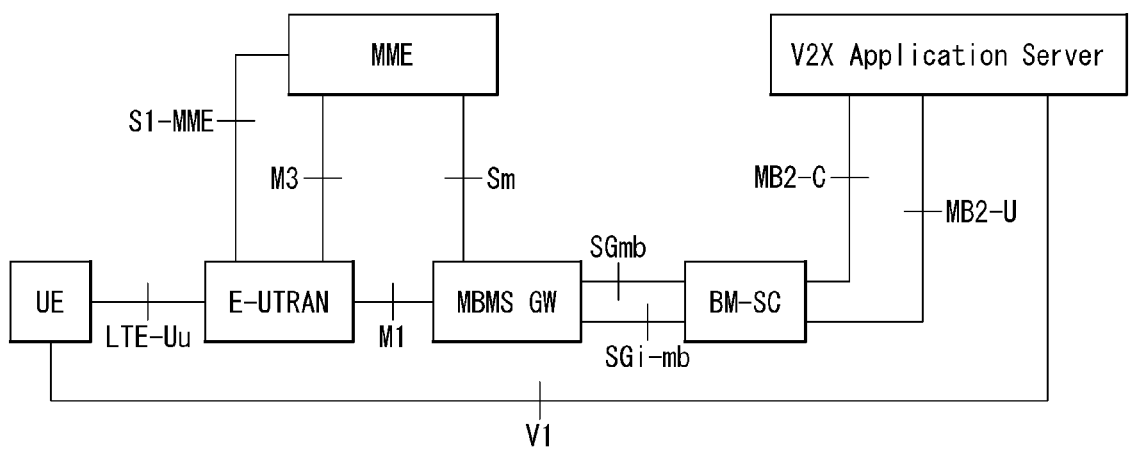

[FIG.12]
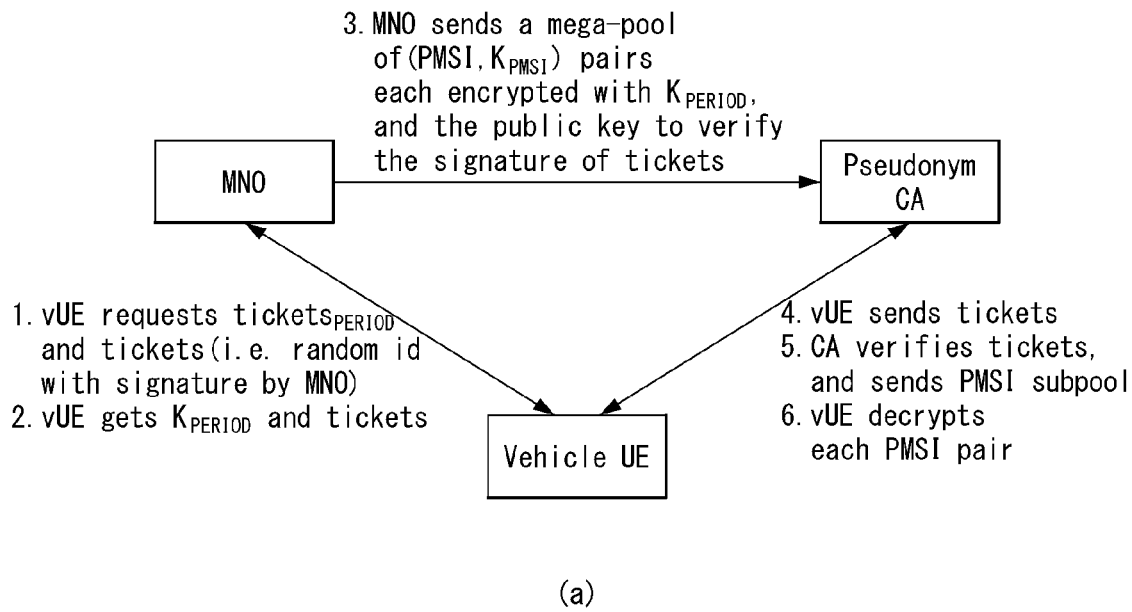
(a)
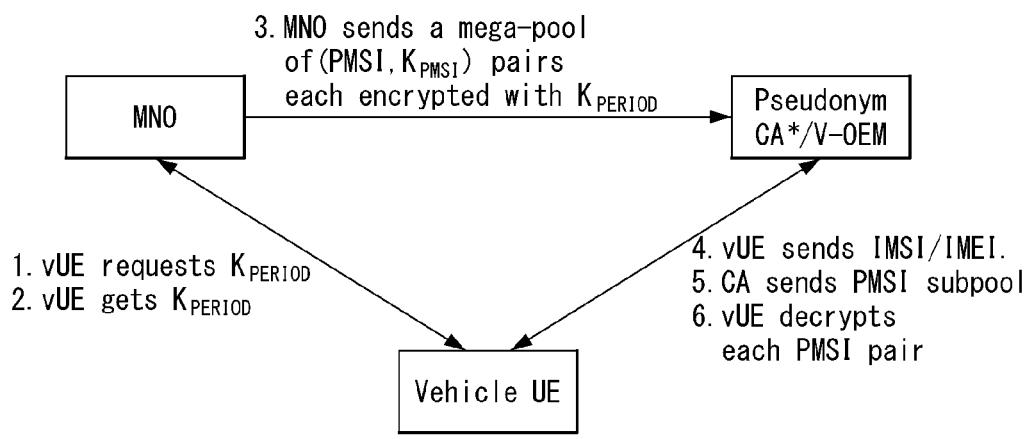
(b)

[FIG.13]
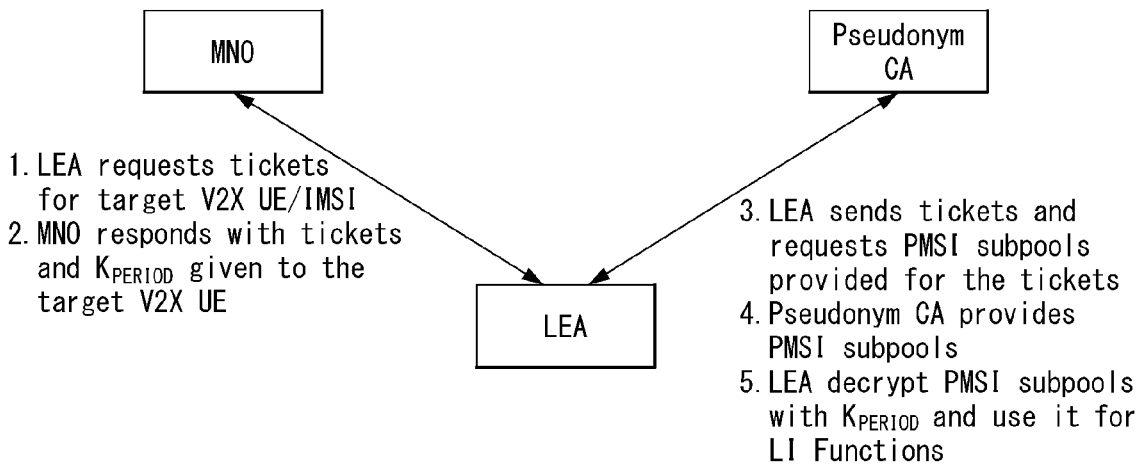
[FIG.14]
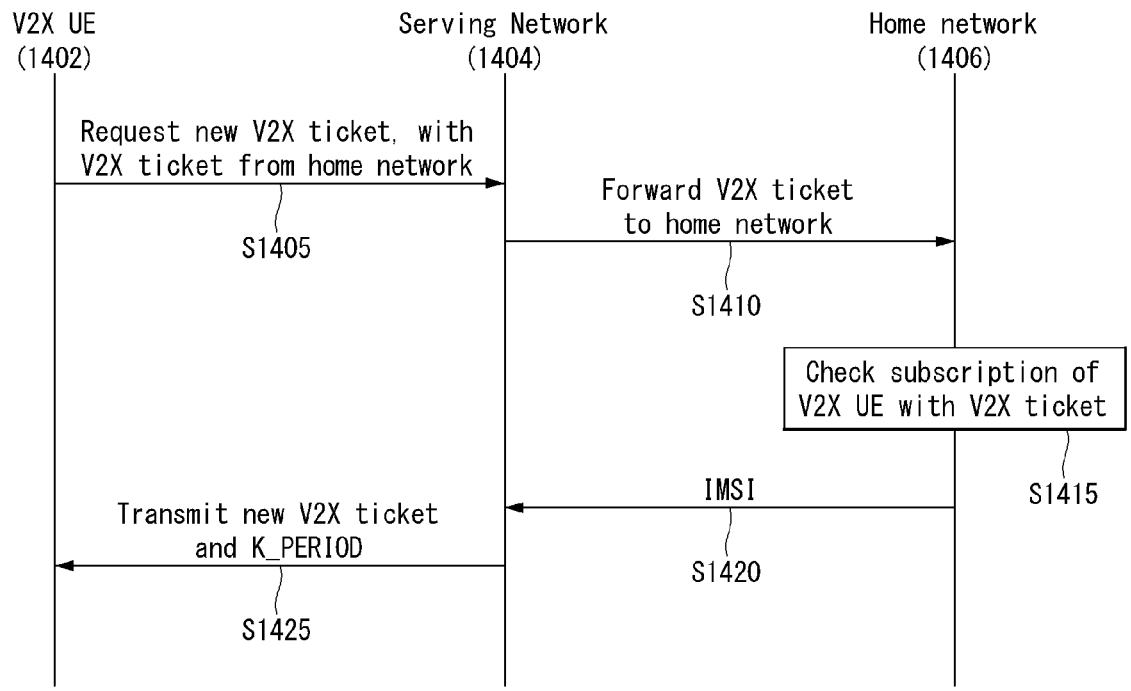

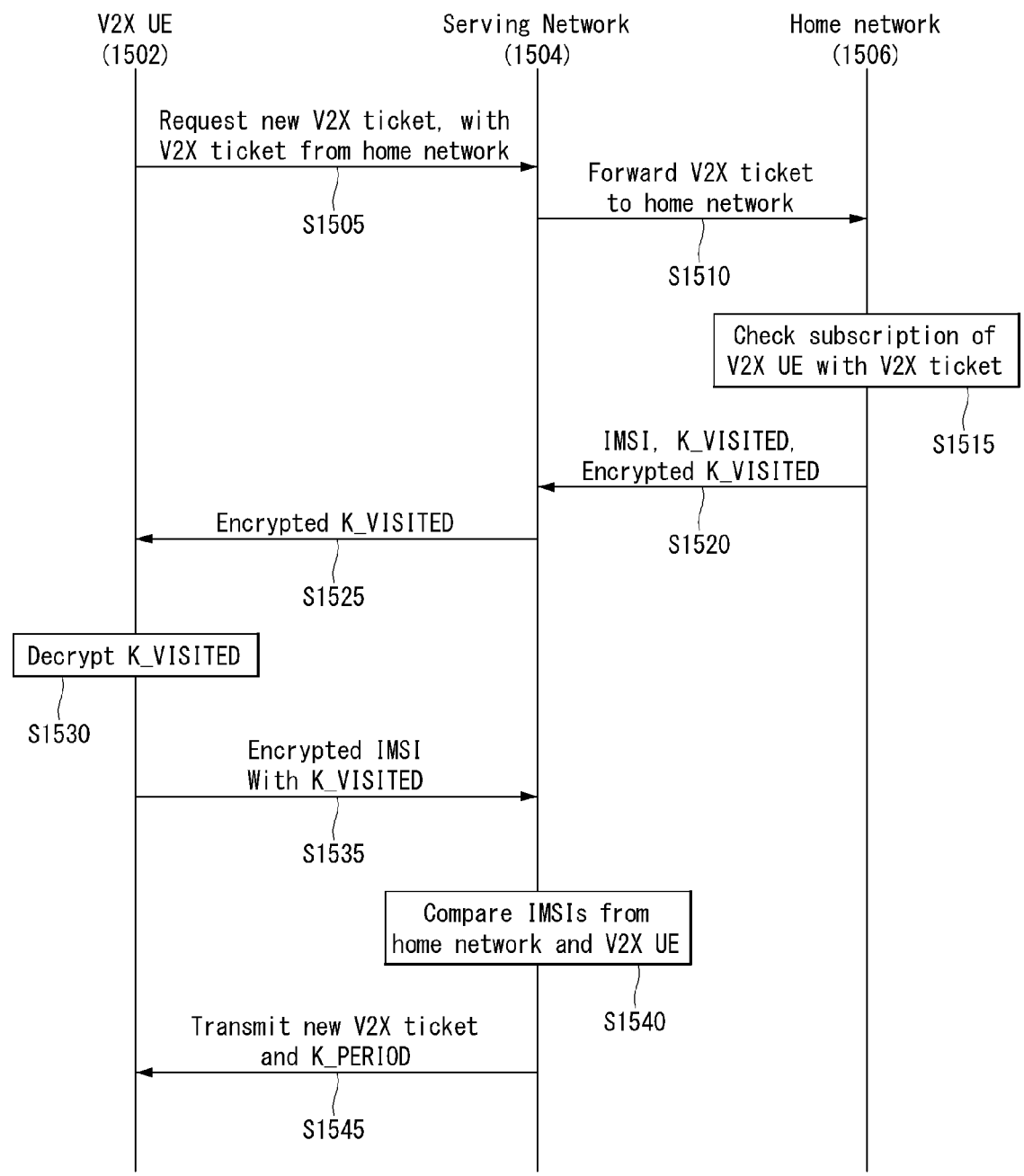
[FIG.15]

[FIG.16]
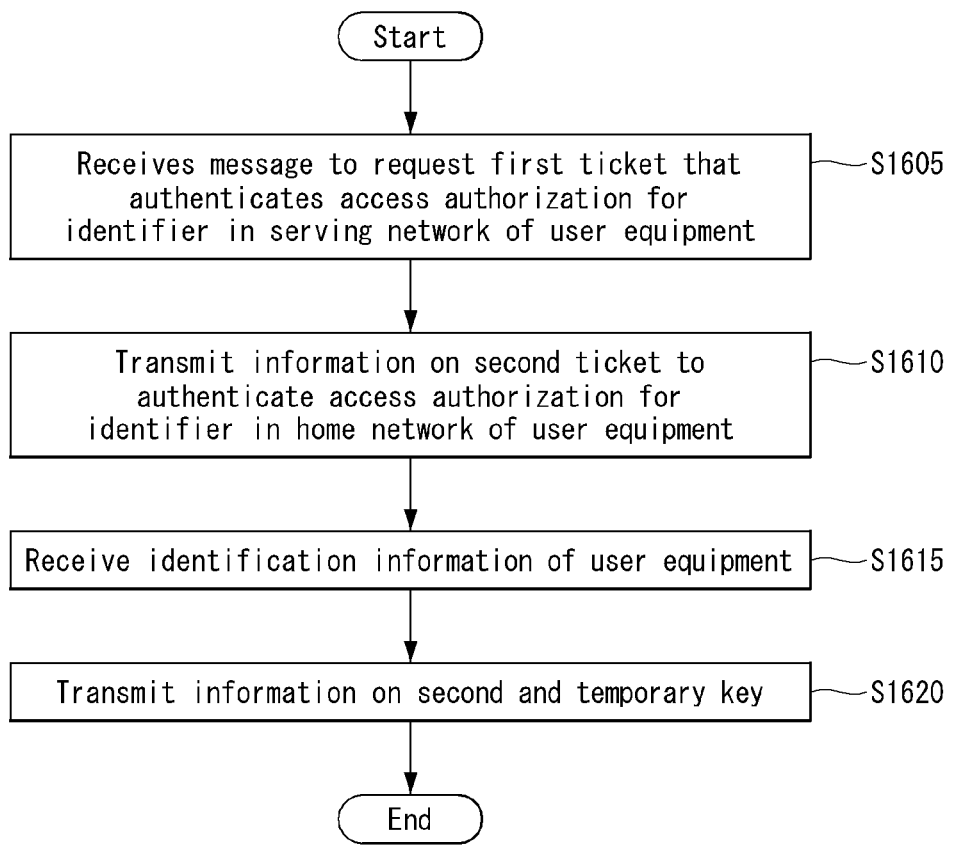

[FIG.17]
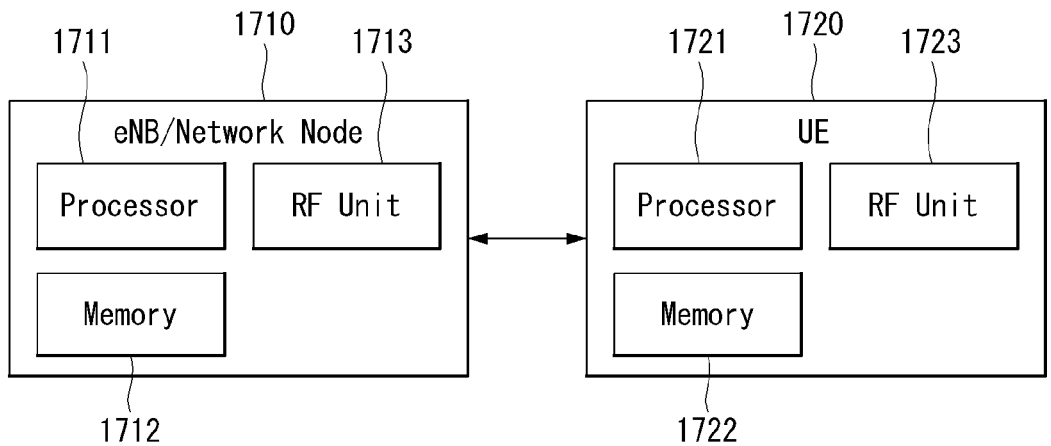
[FIG.18]
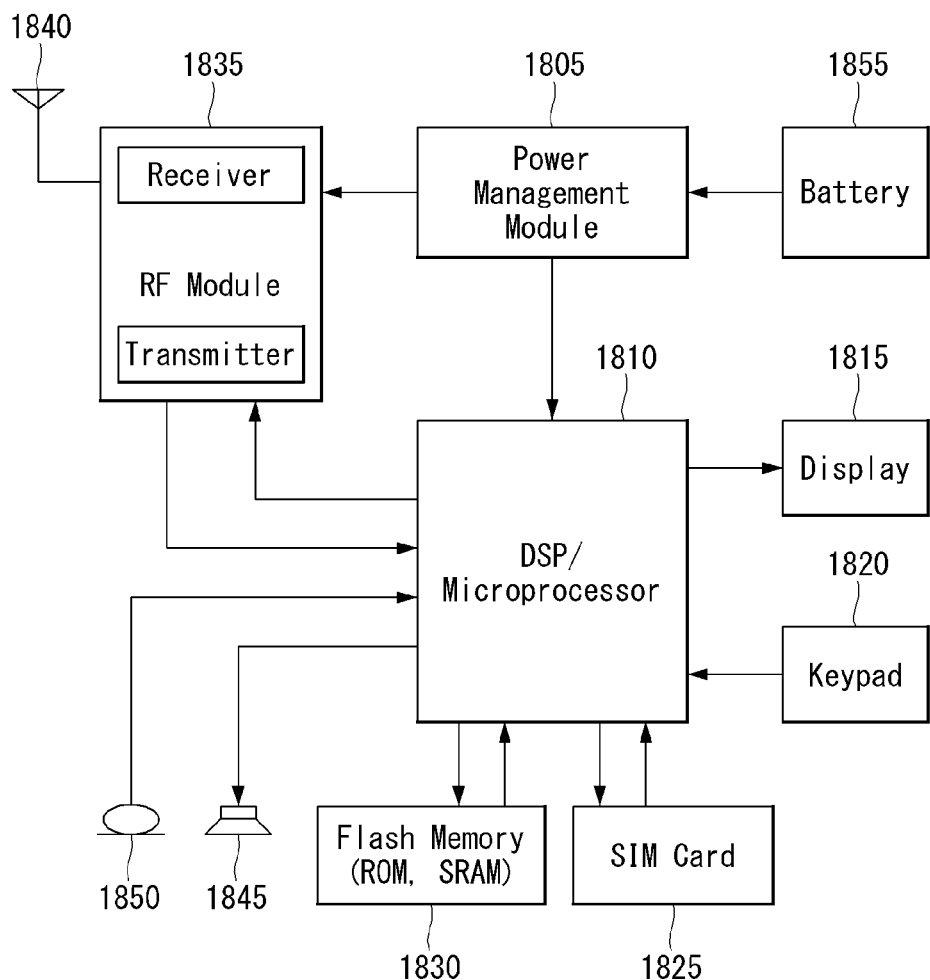

METHOD FOR SECURING CONNECTION IDENTIFIER OF USER EQUIPMENT IN WIRELESS COMMUNICATION SYSTEM AND APPARATUS THEREFOR

CROSS-REFERENCE TO RELATED APPLICATION

This application is the National Stage filing under 35 U.S.C. 371 of International Application No. PCT/KR2018/005275, filed on May 8, 2018, which claims the benefit of U.S. Provisional Application No. 62/502,788, filed on May 8, 2017.

The contents of which are all hereby incorporated by reference herein in their entirety.

TECHNICAL FIELD

The present disclosure relates to a method of securing a connection identifier used for the network access of a user equipment in a wireless communication system and an apparatus therefor and, more particularly, to a method of supporting lawful interception according to the use of pseudonymous mobile subscriber (PMS) IDs for security in network access for V2X communication and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The identifier of a user equipment having further enhanced security may be used to prevent the identifier of a user equipment for network access from being used for a malicious purpose or a use not wanted by a user due to external leaking.

The disclosure provides a support method so that a lawful interception procedure can be autonomously performed in a network onto which a user equipment has roamed if the identifier of the user equipment having further enhanced security is used as described above.

Technical objects of the disclosure are not limited to the aforementioned technical objects, and other technical objects, which have not been mentioned above, will be apparently understood by a person having ordinary skill in the art from the following description.

Technical Solution

In a method of securing the identifier of a user equipment used upon accessing a network in a wireless communication system according to an embodiment of the disclosure, the method may include receiving, from the user equipment, a message to request a first ticket that authenticates access authorization to the identifier in a serving network of the user equipment, the message comprising information on a second ticket to authenticate the access authorization to the identifier in a home network of the user equipment, transmitting, to a mobility management entity (MME) of the home network, the information on the second ticket, receiving, from the MME of the home network, identification information of the user equipment determined based on the information on the second ticket, and transmitting, to the user equipment, the first ticket and information on a temporary key used to encrypt the identifier in the serving network based on the identification information.

Furthermore, in the method according to an embodiment of the disclosure, the identifier may be a pseudonymous mobile subscriber ID (PMSI) assigned to the user equipment for vehicle to anything (V2X) communication network access, and the identification information may be an international mobile subscriber ID (IMSI) assigned to the user equipment for the V2X communication network access.

Furthermore, in the method according to an embodiment of the disclosure, the message may further include operator identification information for the home network.

Furthermore, in the method according to an embodiment of the disclosure, the information on the second ticket may be encrypted using a temporary key used to encrypt the identifier in the home network.

Furthermore, the method according to an embodiment of the disclosure may further include confirming the validity of the identification information using a specific cryptographic key used to confirm the validity of the identification information.

Furthermore, in the method according to an embodiment of the disclosure, confirming the validity of the identification information may include receiving, from the MME of the home network, the specific cryptographic key and specific cryptographic key information encrypted from the specific cryptographic key using a temporary key used to encrypt the identifier in the home network, transmitting the specific cryptographic key information to the user equipment, receiving, from the user equipment, the identification information of the user equipment encrypted using the specific cryptographic key, and confirming whether the identification information of the user equipment received from the user equipment is identical with the identification information of the user equipment received from the MME of the home network.

Furthermore, the method according to an embodiment of the disclosure may further include transmitting, to at least one of to the user equipment or the MME of the home network, a message to request the retransmission of the identification information of the user equipment if the identification information of the user equipment received from the user equipment may not be identical with the identification information of the user equipment received from the MME of the home network.

Furthermore, in the method according to an embodiment of the disclosure, the specific cryptographic key may be generated by the home network.

Furthermore, in the method according to an embodiment of the disclosure, the serving network may be a network roamed by the user equipment from the home network.

Furthermore, in the method according to an embodiment of the disclosure, the first ticket and the information on the temporary key may be information which is used for the user equipment or a lawful enforcement agency (LEA) of the serving network to request a subpool for the identifier from a pseudonym certification authority (PCA) of the serving network.

Furthermore, in the method according to an embodiment of the disclosure, the LEA of the serving network may be an entity performing lawful interception (LI) on the user equipment based on the identifier of the user equipment obtained using the first ticket and the temporary key in the serving network.

In a mobility management entity (MME) for protecting an identifier of a user equipment used upon accessing a network in a wireless communication system according to an embodiment of the disclosure, the MME includes a transceiver for transmitting and receiving signals and a processor configured to control the transceiver. The processor may be configured to receive, from the user equipment, a message to request a first ticket that authenticates access authorization to the identifier in a serving network of the user equipment, the message comprising information on a second ticket to authenticate the access authorization to the identifier in a home network of the user equipment, transmit, to a mobility management entity (MME) of the home network, the information on the second ticket, receive, from the MME of the home network, identification information of the user equipment determined based on the information on the second ticket, and transmit, to the user equipment, the first ticket and information on a temporary key used to encrypt the identifier in the serving network based on the identification information.

Furthermore, In the MME according to an embodiment of the disclosure, the identifier may be a pseudonymous mobile subscriber ID (PMSI) assigned to the user equipment for vehicle to anything (V2X) communication network access, and the identification information may be an international mobile subscriber ID (IMSI) assigned to the user equipment for the V2X communication network access.

Furthermore, in the MME according to an embodiment of the disclosure, the processor may be configured to confirm the validity of the identification information using a specific cryptographic key used to confirm the validity of the identification information.

Furthermore, in the MME according to an embodiment of the disclosure, the processor may be configured to receive, from the MME of the home network, the specific cryptographic key and specific cryptographic key information obtained by encrypting the specific cryptographic key using a temporary key used to encrypt the identifier in the home network if the processor confirms the validity of the identification information, transmit the specific cryptographic key information to the user equipment, receive, from the user equipment, the identification information of the user equipment encrypted using the specific cryptographic key, and confirm whether the identification information of the user equipment received from the user equipment may be identical with the identification information of the user equipment received from the MME of the home network.

Advantageous Effects

According to an embodiment of the disclosure, there is an effect in that security is further enhanced because unique identification information (e.g., IMSI/IMEI) of a user equipment is not transmitted and received to and from another entity and thus the identification information does not leak to the outside.

Furthermore, there is an effect in that although a user equipment performs roaming, the user equipment can perform a lawful interception procedure in a roamed network without the help of a home network after the roaming procedure is terminated.

Effects which may be obtained in the disclosure are not limited to the aforementioned effects and other unmentioned effects will be clearly understood by those skilled in the art from the following description.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 1 shows an example of an evolved packet system (EPS) to which the disclosure may be applied.

FIG. 2 shows an example of the network configuration of an evolved universal terrestrial radio access network (E-UTRAN) to which the disclosure may be applied.

FIG. 3 shows an example of the structure of an E-UTRAN and EPC in a wireless communication system to which the disclosure may be applied.

FIG. 4 shows an example of a radio interface protocol architecture between a user equipment and an E-UTRAN in a wireless communication system to which the disclosure may be applied.

FIG. 5 shows an example of the structure of a physical channel in a wireless communication system to which the disclosure may be applied.

FIG. 6 shows an example of a contention-based random access procedure in a wireless communication system to which the disclosure may be applied.

FIG. 7 is a flowchart illustrating an attach procedure according to an embodiment of the disclosure.

FIG. 8 shows an example of a reference architecture model for PC5 and LTE-Uu-based V2X to which the disclosure may be applied.

FIG. 9 shows another example of a reference architecture model for PC5 and LTE-Uu-based V2X to which the disclosure may be applied.

FIG. 10 shows yet another example of a reference architecture model for PC5 and LTE-Uu-based V2X to which the disclosure may be applied.

FIG. 11 shows an example of a multimedia broadcast multicast service (MBMS) reference architecture model for LTE-Uu-based V2X to which the disclosure may be applied.

FIG. 12 is a diagram illustrating a solution for connection identifier obfuscation for vehicle (V)-UE privacy protection according to an embodiment of the disclosure.

FIG. 13 shows an example of a procedure for supporting lawful interception (LI) according to an embodiment proposed in the disclosure.

FIG. 14 shows another example of a procedure for supporting LI according to an embodiment proposed in the disclosure.

FIG. 15 shows yet another example of a procedure for LI according to an embodiment proposed in the disclosure.

FIG. 16 shows an example of a flowchart for a method of preventing the exposure of the identifier of a user equipment and supporting an LI procedure according to an embodiment of the disclosure.

FIG. 17 illustrates a block diagram of a communication apparatus according to an embodiment of the disclosure.

FIG. 18 illustrates a block diagram of a communication apparatus according to an embodiment of the disclosure.

MODE FOR INVENTION

In what follows, preferred embodiments according to the disclosure will be described in detail with reference to appended drawings. The detailed descriptions provided below together with appended drawings are intended only to explain illustrative embodiments of the disclosure, which should not be regarded as the sole embodiments of the disclosure. The detailed descriptions below include specific information to provide complete understanding of the disclosure. However, those skilled in the art will be able to comprehend that the disclosure can be embodied without the specific information.

For some cases, to avoid obscuring the technical principles of the disclosure, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term (AP) can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the disclosure, and the specific terms can be used in different ways as long as it does not leave the technical scope of the disclosure.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the disclosure can be supported by standard documents disclosed in at least one of wireless access systems including the IEEE 802, 3GPP, and 3GPP2 disclosures. In other words, among the embodiments of the disclosure, those steps or parts omitted for the purpose of clearly describing technical principles of the disclosure can be supported by the documents above. Also, all of the terms disclosed in this document can be explained with reference to the standard documents.

To clarify the descriptions, this document is based on the 3GPP LTE/LTE-A, but the technical features of the disclosure are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. An eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the disclosure will be described based on the terms defined above.

Overview of System to which the Disclosure may be Applied

FIG. 1 shows an example of an evolved packet system (EPS) to which the disclosure may be applied.

The network structure of FIG. 1 is an example of an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

plane. S2b is a reference point which provides related control and mobility resources to the user plane between ePDG and PDN GW.

FIG. 2 illustrates one example of an Evolved Universal Terrestrial Radio Access Network (E-UTRAN) to which the disclosure can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (Vol P)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected to each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the disclosure can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the disclosure can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted for each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the disclosure can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 shows an example of the contention-based random access procedure in the wireless communication system to which the disclosure can be applied.

1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI.

Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Attach Procedure

A UE is required to be registered in a network in order to be provided with a service that requires registration. Such a registration may be referred to as a network access. Hereinafter, an initial access procedure in E-UTRAN will be described.

FIG. 7 is a flowchart illustrating an attach procedure according to an embodiment of the disclosure.

1-2. First, a UE camping on an E-UTRAN cell may start an attach procedure with a new MME by transmitting an Attach Request message to an eNB.

The Attach Request message includes an International Mobile Subscriber Identity (IMSI) of the UE, a PDN type requested by the UE, and the like. Here, the PDN type indicates an IP version (i.e., IPv4, IPv4v6 or IPv6) requested by the UE.

The Attach Request message is forwarded by being included in an RRC Connection Setup Complete message in an RRC connection, and forwarded by being included in an Initial UE message in an S1 signaling connection.

In order to request PDN connectivity, the UE may also transmit an Attach Request message together with a PDN Connectivity Request message.

3. If the UE distinguishes the UE itself using a GUTI and an MME is changed to detach later, a new MME may determine a type of an old node (e.g., MME or SGSN) and may use the GUTI received from the UE in order to derive the old MME/SGSN address. In addition, the new MME may transmit an Identification Request (including old GUTI and complete Attach Request message) to the old MME/SGSN in order to request an IMSI. The old MME may identify the Attach Request message by a NAS MAC first, and then may perform an Identification Response (including IMSI and MM context) in response to the Identification Request.

4. If the UE is not known to all of the old MME/SGSN and the new MME, the new MME may transmit an Identification Request to the UE in order to request the IMSI. The UE may respond to the corresponding identification request in response to the Identification Response including the IMSI.

5a. If a UE context is not present in a network, the Attach Procedure is not integrity protected, or identification of integrity is failed, the Authentication and NAS security setup for activating the integrity protection and the NAS ciphering may be essentially performed. If the NAS security algorithm is changed, the NAS security setup may be performed in this procedure.

5b. The new MME may retrieve/search IMEISV (ME Identity) from the UE. At this time, the IMEISV (ME Identity) may be coded and transmitted except the case that the UE performs an emergency access or is unable to authenticate.

6. If the UE configures a Ciphered Options Transfer Flag in the Attach Request message, the new MME may retrieve/search Ciphered Options (e.g., Protocol Configuration Options (PCO) and/or APN (name of PDN)) from the UE.

7. If a bearer context activated in the new MME for a specific UE is present, the new MME deletes the bearer context by transmitting LBI (Delete Session Request) message to a GW. The GWs respond with a Delete Session Response (Cause) message.

8. After the Detach, if the MME is changed, there is no valid UE for the MME, the UE provides an IMSI, the UE provides an invalid old GUTI for the MME, or a GUTI of the UE context is different in the scenario in which a PLMN-ID of TAI by an eNB is shared (e.g., GWCN) in a part of networks, the MME may transmit an Update Location request message to an HSS.

9. The HSS transmits a Cancel Location (including IMSI and Cancellation Type) to the old MME. The old MME responds through Cancel Location Ack (including IMSI), and removes Mobility Management (MM) context and the bearer context.

10. If there is an activated bearer context in the old MME/SGSN with respect to a specific UE, the old MME/SGSN may remove the corresponding bearer context by transmitting Delete Session Request (LBI) to the GW. The GW may transmit the Delete Session Response (Cause) to the old MME/SGSN.

11. In response to the Update Location Request message, the HSS may transmit an Update Location Ack message (including IMSI and Subscription data) to the new MME.

12. In the case of urgent Attach, the MME may apply parameters from MME urgent configuration data for an urgent bearer establishment performed in this step, and may ignore IMSI-related subscriber information stored potentially.

13. A serving GW generates a new item in an EPS Bearer table, and sends a Create Session Request message to a PDN GW (or P-GW) indicated by the PDN GW address which is received from the previous step.

14. If a dynamic PCC is performed and handover indication is not present, the PDN GW performs an IP-CAN Session Establishment process defined in TS 23.203 [6], and by doing this, the PDN GW obtains default PCC rule for the UE.

Steps 12 to 16 described above may be omitted if EPS Session Management (ESM) container is not included in the Attach Request.

15. The P-GW generates a new item in the EPS bearer context table, and generates a charge ID for the default bearer. The new item allows a user plane PDU path between the S-GW and a packet data network by the P-GW and a charge start. In addition, the P-GW transmits a Create Session Response message to the Serving GW.

16. The Serving GW transmits the Create Session Response message to the new MME.

17. The new MME may transmit downlink NAS transport together with an initial context setup request or Attach Accept to the eNB.

18. The eNB transmits an RRC Connection Reconfiguration message including an EPS Radio Bearer Identity to the UE, and at this time, an Attach Accept message is also transmitted to the UE.

19. The UE transmits an RRC Connection Reconfiguration Complete message to the eNB.

20. The eNB transmits an Initial Context Response message to the new MME. The Initial Context Response message includes an address of the eNB used for DL traffic of S1-U reference point.

21. The UE sends a Direct Transfer message including an Attach Complete message (including EPS Bearer Identity, NAS sequence number and NAS-MAC) to the eNB.

22. The eNB forwards the Attach Complete message to the new MME.

23. If both of the Initial Context Response of step 20 and the Attach Complete message of step 22 are received, the new MME transmits a Modify Bearer Request message to the Serving GW.

23a. If a handover indication is included in step 23, the Serving GW sends the Modify Bearer Request message to the PDN GW.

23b. The PDN GW may respond to the Modify Bearer Request message by transmitting a Modify Bearer Response to the Serving GW.

24. The Serving GW may transmit the Modify Bearer Response message (including EPS Bearer Identity) to the new MME. Next, the Serving GW may send buffer DL packets of the Serving GW.

25. The MME sends a Notify Request message including APN and PDN GW identity to the HSS for non-3GPP attach. The corresponding message includes information identifying a PLMN in which the PDN GW is located.

26. The HSS stores the APN and PDN GW identity pair and transmits the Notify Response to the MME.

V2X(Vehicle-to-Anything(Vehicle/Infrastructure/Pedestrian)) Communication

Hereinafter, V2X communication related technology providing the following service types will be described. Three representative service types of V2X communication is exemplified as follows.

V2V (vehicle-to-vehicle): Communication between vehicles

V2I (vehicle-to-infrastructure): Communication between a vehicle and a roadside unit (RSU) which is implemented in an eNB or a stationary UE V2P (vehicle-to-pedestrian): Communication between a vehicle and a device carried by an individual (pedestrian, cyclist, driver or passenger)

A message for the V2X service includes a message transmitted periodically by the UE and a message transmitted when a specific event occurs. In the European Telecommunications Standards Institute (ETSI), various use cases and V2X messages related to Intelligent Transport Systems (ITS) are defined as shown in Tables 2 and 3 below.

TABLE 2

| ETSI ITS message category | Message name | Message type CAM (Cooperative Awareness Message) | Transmission mode | Minimum frequency (Hz) | Maximum latency (ms) | Fro | To |
|---|---|---|---|---|---|---|---|
| Vehicle type warnings | Emergency Vehicle Warning | CAM | Broadcast | 10 | 100 | V | V |
| | Slow Vehicle Indication | CAM | Broadcast | 2 | 100 | V | V |
| | Motorcycle Approaching Indication | CAM | Broadcast | 2 | 100 | V | V/I |
| | Vulnerable road user Warning | CAM | Broadcast | 1 | 100 | I/P | V |

TABLE 2-continued

| ETSI ITS message category | Message name | Message type CAM (Cooperative Awareness Message) | Transmission mode | Minimum frequency (Hz) | Maximum latency (ms) | Fro | To |
|---|---|---|---|---|---|---|---|
| Dynamic vehicle warnings | Overtaking vehicle warning | CAM | Broadcast | 10 | 100 | V | V |
| | Lane change assistance | CAM | Broadcast | 10 | 100 | V | V |
| | Co-operative glare reduction | CAM | Broadcast | 2 | 100 | V | V |
| Collision Risk Warning | Across traffic turn collision risk warning | CAM | Broadcast | 10 | 100 | V | V |
| | Merging Traffic Turn Collision Risk Warning | CAM | Broadcast | 10 | 100 | V | V |
| | Co-operative merging assistance | CAM | Broadcast | 10 | 100 | V | V/I |
| | Intersection Collision Warning | CAM | Broadcast | 10 | 100 | V | V |
| | Traffic light optimal speed advisory | CAM | Broadcast | 2 | 100 | I | V |
| | Traffic information and recommended itinerary | CAM | Broadcast | 1~10 | 500 | I | V |
| | Enhanced route guidance and navigation(RSU Capability) | CAM | Broadcast | 1 | 500 | I | V |
| | Intersection management | CAM | Broadcast | 1 | 500 | I | V |
| | Co-operative flexible lane change | CAM | Broadcast | 1 | 500 | I | V |
| | Limited access warning, detour notification | CAM | Broadcast | 1~10 | 500 | I | V |
| | In-vehicle signage | CAM | Broadcast | 1 | 500 | I | V |
| | Electronic toll collect | CAM | Broadcast | 1 | 200 | I | V |
| Others | Point of interest notification | CAM | Broadcast | 1 | 500 | I | V |
| | Automatic access control/parking access | CAM | Broadcast | 1 | 500 | I | V |
| | Local electronic commerce | CAM | Broadcast | 1 | 500 | I | V |
| | Car rental/sharing assignment/reporting | CAM | Broadcast | 1 | 500 | I | V |
| | Media downloading | CAM | Broadcast | 1 | 500 | I | V |
| | Map download and update | CAM | Broadcast | 1 | 500 | I | V |
| | Ecological/economical drive | CAM | Broadcast | 1 | 500 | I | V |
| | Instant messaging | CAM | Broadcast | 1 | 500 | I | V |
| | Personal data synchronization | CAM | Broadcast | 1 | 500 | I | V |
| | SOS service | CAM | Broadcast | 1 | 500 | I | V |
| | Stolen vehicle alert | CAM | Broadcast | 1 | 500 | I | V |
| | Remote diagnosis and just in time repair notification | CAM | Broadcast | 1 | 500 | I | V |
| | Vehicle relation management | CAM | Broadcast | 1 | 500 | I | V |
| | Vehicle data collect for product life cycle management | CAM | Broadcast | 1 | 500 | I | V |
| | Insurance and financial Services | CAM | Broadcast | 1 | 500 | I | V |
| | Fleet management | CAM | Broadcast | 1 | 500 | I | V |
| | Vehicle software/data provisioning and update | CAM | Broadcast | 1 | 500 | I | V |
| | Loading zone management | CAM | Broadcast | 1 | 500 | I | V |
| | Vehicle and RSU data calibration | CAM | Broadcast | 1 | 500 | I | V |

TABLE 3

| Message category | Message name | Message type DENM (Decentralized Environmental Notification Message) | Transmission mode | Minimum frequency (Hz) | Maximum latency (ms) | From | To |
|---|---|---|---|---|---|---|---|
| Vehicle status warnings | Emergency electronic brake lights | DENM | Broadcast | 10 | 100 | V | V/I |
| | Safety function out of normal condition warning | DENM | Broadcast | 10 | 100 | V | V/I |
| Traffic hazard warnings | Wrong way driving warning | DENM | Broadcast | 10 | 100 | V | V/I |
| | Stationary vehicle warning | DENM | Broadcast | 10 | 100 | V | V/I |
| | Signal violation warning | DENM | Broadcast | 10 | 100 | V | V |
| | Roadwork warning | DENM | Broadcast | 2 | 100 | I | V |
| | Collision Risk Warning from RSU | DENM | Broadcast | 10 | 100 | I | V |

The V2X message may be transmitted to the air using direct communication.

Hereafter, examples of a reference architecture model for V2X are described.

First, FIG. 8 shows an example of a reference architecture model for PC5 and LTE-Uu-based V2X to which the disclosure may be applied.

Specifically, FIG. 8 shows a non-roaming architecture of a high level for PC5 and LTE-Uu-based V2X communication.

Next, FIG. 9 shows another example of a reference architecture model for PC5 and LTE-Uu-based V2X to which the disclosure may be applied.

Specifically, FIG. 9 shows a roaming architecture of a high level for PC5 and LTE-Uu-based V2X communication. In FIG. 9, a user equipment A (UE A) uses the subscription of a PLMN A, and a user equipment UE B (UE B) uses the subscription of a PLMN B. In this case, the UE A is roaming in a PLMN C, whereas the UE B is not roaming.

Furthermore, a V2X application server may be connected to multiple PLMNs. For example, one V2X application server may be connected to the V2X control function of the PLMN A and the V2X control function of the PLMN B.

Next, FIG. 10 shows yet another example of a reference architecture model for PC5 and LTE-Uu-based V2X to which the disclosure may be applied.

Specifically, FIG. 10 shows an inter-PLMN architecture of a high level for PC5 and LTE-Uu-based V2X communication. In FIG. 10, a user equipment A (UE A) uses the subscription of a PLMN A, and a user equipment B (UE B) uses the subscription of a PLMN B. In this case, the UE A is roaming in a PLMN C, whereas the UE B is not roaming.

Next, FIG. 11 shows an example of a multimedia broadcast multicast service (MBMS) reference architecture model for LTE-Uu-based V2X to which the disclosure may be applied.

Specifically, FIG. 11 shows an MBMS reference architecture of a high level for LTE-Uu-based V2X communication.

In a wireless communication system, a V2X control function may be defined as a logical function used for network-related tasks necessary for V2X. In this case, reference points newly defined to perform the V2X control function may be defined as follows:

V1: a reference point between a V2X application and a V2X application server.

V2: a reference point between a V2X application operator and a V2X control function in an operator network. The V2X Application is connected to V2X control functions belonging to multiple PLMNs.

V3: a reference point between a V2X enabled UE and a V2X control function in the operator network.

V4: a reference point between an HSS and a V2X control function in an operator network.

V5: a reference point between V2X applications.

V6: a reference point between the V2X control function of an HPLMN and the V2X control function of a VPLMN.

PC5: a reference point between user equipments used for a user plane for Prose Direct communication of V2X.

S6a: in addition to a related function defined in the standard (e.g., 3 gpp TS 23.401), in the case of V2X service, S6a is used to download V2X service-related subscription information to an MME during an E-UTRAN attach procedure or to notify that there is a change in MME subscription information of an HSS.

S1-MME: in addition to a related function defined in the standard (e.g., 3 gpp TS 23.401), in the case of V2X service, an S1-MME is used to deliver V2X service authorization from an MME to an eNodeB.

MB2: a reference point between a V2X application server and a BM-SC.

SGmb/SGi-mb/M1/M3: an SGmb/SGi-mb/M1/M3 reference point is present within an MBMS system.

LTE-Uu: a reference point between a V2X enabled UE and an E-UTRAN.

Furthermore, a procedure related to PC5 and LTE-Uu-based V2X message transmission and reception is as follows.

First, V2X message transmission and reception through a PC5 reference point is described. The PC5 reference point may be used for the transmission and reception of a V2X message(s). V2X communication through the PC5 reference point may support roaming and operations between PLMNs. V2X communication through the PC5 reference point is supported in the case where a UE "is served by an E-UTRAN" and the case where a UE "is not served by an E-UTRAN."

A user equipment has an authorization to transmit and receive a V2X message using a V2X control function in a home PLMN. Furthermore, V2X communication through the PC5 reference point may be a type of Prose Direct communication having the following characteristics.

V2X communication through the PC5 reference point is connectionless, and has not signal transmission through a PC5 control plane for connection establishment.

V2X messages are exchanged between user equipments through a PC5 user plane.

All IP-based and non-IP-based V2X messages are supported.

In the case of an IP-based V2X message, only IPv6 is used. In this release, IPv4 is not supported.

Next, V2X message transmission and reception through the LTE-Uu reference point is described.

In general, the LTE-Uu reference point is used for the transmission and reception of V2X messages. Hereafter, V2X message transmission and reception through unicast and V2X reception through an MBMS are described.

First, V2X communication through unicast over the LTE-Uu reference point supports a roaming operation. A latency reduction of V2X message transmission through unicast may be achieved using SIPTO@LN or SIPTO.

Furthermore, with respect to the transmission of a V2X message using uplink unicast V2X communication, in the case of an application identified by a PDSI or ITS-ADI for the same application as that of the PC5 reference point:

A V2X message is transmitted through UDP/IP packets. In this case, a standby time attributable to connection setup is short, and a UDP may be selected because IP multicast operates only in the UDP.

A user equipment transmits a V2X message to a V2X application server address through a UDP/IP. The intended V2X application server address is derived from a PSID (or ITS-ADI) and UE configuration.

A V2X application server receives a V2X message in the UDP/IP packet of the V2X application server address.

Furthermore, in the case of V2X message transmission for an application different from an application having a PCID or ITS-AID for the PC5 reference point, the existing unicast routing for the V2X application server may be applied.

Next, as shown in FIG. 11, the V2X message may be broadcasted through an MBMS. In this case, the V2X application server transmits the V2X message through MBMS bearer service.

In the case of the MBMS reception of the V2X message, a V2X USD per PLMN for V2X service is necessary for a user equipment. The user equipment is provisioned as the mapping of the PSID (or ITS-AID) and the V2X USD.

The following methods may be used to provide a V2X USD to a user equipment.

The existing MBMS service announcement mechanism

Provisioning. That is, a pre-configuration of the user equipment and/or a configuration from a V2X control function Provisioning in the V2X application server through V1 reference point.

In this case, the user equipment may receive downlink broadcast from a PLMN other than a serving PLMN based on an obtained V2X USD(s). Furthermore, an operator may configure a plurality of MBMS service regions for a specific V2X service. If one of the MBMS service regions overlaps, the user equipment may need to configure then overlapped MBMS service region for such a V2X service with a different TMGI.

The V2X application server that provides V2X service identified by a PSID (or ITS-AID) transmits a V2X message through UDP/IP transmission using information provided by a V2X USD. In the case of latency improvement for an MBMS, a localized MBMS may be considered for the localized routing of the V2X message toward the user equipment.

Furthermore, in order to hide and protect the 3GPP access or attach identity or identifier (ID) (e.g., IMSI) of a V2X UE, a salutation, such as that illustrated in FIG. 12, may be proposed. The UE identifier used for V2X communication is individually managed with respect to the existing 3GPP identity (e.g., by a third party server that is organizationally different like vehicle OEM), and may be referred to as a "pseudonymous mobile subscriber (PMS) ID." The PMSI may be used for V2X LTE attach/V2X communication instead of a 3GPP IMSI.

FIG. 12 is a diagram illustrating a solution for connection identifier obfuscation for vehicle (V)-UE privacy protection according to an embodiment of the disclosure.

As an initial step, a UE may request authentication for a V2X operation from a home V2X control function. This may be performed based on a common 3GPP identity and under an agreement with an HSS for UE subscription information.

The following characteristics may be assumed for the illustrated entities (i.e., mobile network operator (MNO), pseudonym certification authority (PCA), original equipment manufacturer (V-OEM), and vehicle UE).

Vehicle UE sets up a secure end-to-end link for a third party server (e.g., pseudonym CA (PCA) or V-OEM). The vehicle UE (V-UE) also shares an LTE credential with the MNO.

Furthermore, the MNO may share a ticket (i.e., may share a certificate pool) with each V-UE. In this case, the ticket pool may be used for the authentication of the V-UE during a PMSI distribution from the PCA to the V-UE. Furthermore, the MNO may share a public key, used for the verification of the ticket, with the PCA.

The MNO uses a function for generating a (PMSI, Key) pair for attach. The MNO distributes/rations a cyclic key (K_PERIOD) to all V-UEs.

Referring to FIG. 12, in this solution, the MNO provides each of its own vehicle UEs with K_PERIOD (the same for all UEs) for encrypting a PMSI in order to hide a PMSI from a third party server. In this case, K_PERIOD is a cryptographic key shared between the MNO and the V-UE for the protection of (PMSI, K_PMSI) pairs. K_PERIOD may be periodically updated and shared by the MNO (if the update cycle of K_PERIOD is very long, there is a danger of damage attributable to the leakage of K_PERIOD. If the update cycle of K_PERIOD is very short, there may be overhead in sharing K_PERIOD).

In the LTE V2X architecture, a V2X control function may be performed by transmitting a PMSI key shared with each UE when authentication is successful.

More specifically, this solution may be performed according to the following step.

1. A v-UE sets up a security link with its own MNO (e.g., V2X control function), and may request K_PERIOD, that is, a temporary key (e.g., monthly), and a ticket (i.e., a random ID having a signature by the MNO).

2. The v-UE obtains the temporary key K_PERIOD of the MNO. All v-UEs have the same temporary sharing key. Additionally, the v-UE has a pool of tickets. In this case, the ticket may be used for each request of a PMSI subpool for the PCA.

3. With respect to each PCA, the MNO generates many (PMSI, K_PMSI) pairs and encrypts each pair using K_PERIOD. In this case, K_PMSI corresponds to a cryptographic key used for LTE attach protection/approval. Conventionally, for attach approval, a cryptographic key previously shared between a UE and an HSS was used. However, in the case of this solution, K_PMSI is separately provided because the PMSI is used. Furthermore, the MNO may transmit the megapool and the public key to the PCA in order to confirm the signature of the ticket.

4. The v-UE may set up a security connection for the PCA, and may obtain a PCA K_vUE. The V-UE and the PCA may set up an end-to-end security link based on the PCA K_vUE. The v-UE may transmit, to the PCA, a ticket (i.e., a random ID having a signature by the MNO). The MNO link (WAN) may be used as a transport.

5. The PCA certifies the ticket. If the ticket is valid, the PCA selects a subpool of (PMSI, K_PMSI) pairs for the IMSI, and stores a mapping relation between the corresponding IMSI and the selected subpool. The PCA transmits the selected subpool to the v-UE.

6. The v-UE decrypts each received (PMSI, KPMSI) pair using K_PERIOD.

According to this solution, the v-UE has some (PMSI, K_PMSI) pairs used for attach. In this case, the MNO is aware that the corresponding PMSI is an authorized PMSI, but cannot be aware of the IMSI of the UE.

The solution proposed in relation to this drawing has been introduced for the purpose of preventing information, such as the moving speed or direction of a vehicle, from being used for another malicious purpose (e.g., a celebrity's vehicle tracking) or a use (e.g., overspeed ticket issue) not wanted by a user not road safety or useful information because the information, such as the moving speed or direction of a vehicle, is exposed in using V2X service. A difference between the solution and the existing location service protection or UE identifier protection is that an IMSI or other identifier used as a UE ID in 3GPP can be protected against an attacker in a common third party position and a service provider.

However, the solution proposed in FIG. 12 may have a weak point in that the lawful interception (LI) of a lawful investigation purpose cannot be performed according to legal requirements. The reason for this is that it is impossible to track a V2X user equipment based on an IMSI, that is, an identifier that may uniquely define an actual service subscriber (e.g., 3GPP communication service subscriber), because the V2X user equipment is indicated based on only a PMSI.

Particularly, if a user equipment roams onto another area, whether LI for the corresponding user equipment is possible may be problematic. In this case, it is necessary to perform LI using only the LI function of a serving network of the corresponding area even without the help of a home network service provider (i.e., home mobile network operator).

For example, when a core network is configured with a home network and a serving network, although a user equipment has roamed from the home network to the serving network, LI needs to be performed in the serving network without the help of the home network.

In the disclosure, a serving network on which the roaming of a user equipment is performed may also be referred to as a visited network, newly serving network or roamed serving network. Furthermore, the home network may also be referred to as the home environment of a corresponding V2X UE.

Accordingly, in order to solve the above-described problems, the disclosure proposes a method of providing LI in a pseudonym system for V2X privacy. In this case, the method proposed in the disclosure may include a method of performing LI if a user equipment roams onto another country and/or area, that is, if roaming is performed between networks.

Methods proposed in the disclosure are described based on the case where a main agent that generates an identifier (i.e., ID), a credential and/or a certificate and a main agent that distributes the identifier, credential and/or certificate are the same, but the disclosure is not limited thereto. That is, although the main agent that generates an ID, a credential and/or a certificate and the main agent that distributes the ID, credential and/or certificate are the same are different (if there is a problem in that the main agent that distributes an ID, a credential and/or a certificate can be aware of information on a V-UE entity through conspiracy with another main agent), the solutions proposed in the disclosure may be identically/similarly applied.

Furthermore, in the disclosure, a user equipment having a V2X function (or supporting V2X service) is referred to as a "UE (or V2X UE, v-UE or vehicle-UE)." For example, the UE, V2X UE, v-UE or vehicle-UE may correspond to a UE installed in a vehicle or located within a vehicle and having a V2X function, a V2X function-mounted UE carried by a pedestrian, or a road side unit (RSU) having a V2X function.

A scheme for providing V2X user equipment privacy in V2X service and LI for a V2X pseudonym system, proposed in the disclosure, may be configured with a combination of at least one of configurations and/or operations that are proposed below.

Particularly, roaming methods described through a second embodiment, a third embodiment, and a fourth embodiment may be configured so that they are commonly performed when a V2X user equipment roams (e.g., roaming between communication service providers or roaming between PLMNs (inter-PLMN roaming)). Accordingly, if the target of actual LI is not determined, the roaming methods may be configured so that LI is performed at any time.

Furthermore, methods described in the disclosure are described based on an LTE system-based V2X system, but may also be identically/similarly applied to a new RAT (NR) system-based V2X system.

Hereafter, a method of performing or supporting LI in a home network or a serving network is described specifically.

In this case, the home network may mean a network with which a subscriber (i.e., user equipment) has been registered. In contrast, the serving network may mean a network on which a subscriber has temporarily performed roaming, and may mean a network that has deviated from a home network boundary. Furthermore, hereinafter, in the disclosure, for convenience of description, an entity (e.g., MME) operating in the home network may be referred to as a home network, and an entity (e.g., MME) operating in the serving network may be referred to as a serving network.

Furthermore, in the disclosure, what a user equipment roams may mean that the user equipment moves from a network with which the user equipment has not been registered, that is, a first network (e.g., home network), to another network, that is, a second network (e.g., serving network) and is supported with service.

In relation to the embodiments of the disclosure to be described hereinafter, a function and/or entity for the MNO and pseudonym CA (PCA) are the same or similar to that described above, and thus a redundant description thereof is omitted.

Furthermore, a PMSI, a ticket, K_PERIOD, etc. described in the embodiments of the disclosure may be the same or similar to those described above, and thus a detailed description thereof is omitted. That is, a PMSI may mean a user equipment identifier used for V2X communication instead of an IMSI. Furthermore, a ticket may mean a different false name or certificate used instead of an IMSI/IMEI when a user equipment requests an encrypted PMSI subpool from a PCA. Furthermore, K_PERIOD may mean a cryptographic key shared between an MNO and a V2X UE shared for the protection of (PMSI, K_PMSI) pairs.

First Embodiment

First, a method for supporting LI performed when a V2X UE is present in a home network is described.

FIG. 13 shows an example of a procedure for supporting lawful interception according to an embodiment proposed in the disclosure. FIG. 13 is merely for convenience of description, and does not restrict the disclosure.

In FIG. 13, a lawful enforcement agency (LEA) may mean an organization that performs an authorized procedure for LI. In this case, the LEA may include an entity, a user equipment, a server, etc. that performs LI.

As described above, if a PMSI is used to protect the privacy of a user equipment, an LI procedure performed between the MNO, the PCA and the LEA may be performed according to the following steps.

1. The LEA may request, from the MNO, information on a ticket and K_PERIOD given to a target V2X UE (or target IMSI).

2. The MNO may respond as the information on a ticket and K_PERIOD given to the target V2X UE. That is, the MNO may transmit the ticket and K_PERIOD to the LEA as a response according to the 1-step request.

3. The LEA may transmit, to the PCA, the ticket received from the MNO. In this case, the LEA may request information on a PMSI subpool provided for the corresponding ticket. That is, the LEA may request, from the PCA, the information on an encrypted PMSI subpool(s) given to the corresponding ticket.

4. The PCA may provide information on a PMSI subpool requested by the LEA. Specifically, the PCA may select an encrypted PMSI subpool (i.e., a subpool of (PMSI, K_PMSI) pairs), given to the corresponding ticket, from a megapool, and may transmit information on the selected PMSI subpool to the LEA. In this case, as described above, the PCA may confirm the validity of the corresponding ticket by considering the valid period of the ticket (i.e., the time taken to actually request the PMSI from the PCA).

5. The LEA that has received the information on the encrypted PMSI subpool may decrypt the encrypted PMSI subpool using K_PERIOD received from the MNO. The LEA may use the decrypted PMSI subpool as an LI function(s).

In this case, when the time expires, the V2X UE updates the ticket and the PMSI subpool. Accordingly, the LEA needs to repeatedly perform the above-described procedures during the period (or cycle) of LI.

Through the above-described procedures, although a PMSI is used instead of an IMSI, the LEA of a home network can perform an LI procedure on a target V2X UE (or target IMSI). That is, there is an advantage in that LI can be performed while protecting privacy, such as identification information of a user equipment, such as an IMSI.

Second Embodiment

Next, a method of supporting LI if a user equipment roams onto a serving network unlike in the first embodiment is described.

If a V2X UE has roamed from a home network to a serving network, the existing roaming procedure for inter-MME handover and/or LTE attach may be performed. In such a procedure, a V2X UE may transmit its own identification information, that is, an IMSI value, to a network (e.g., MME) through a radio interface. In this case, the radio interface may mean a wireless communication path.

After the procedure for the serving network is terminated, as in the case of a home network, the V2X UE may request, from the serving network (i.e., newly serving network) and an affiliated PCA, information on a ticket and a PMSI subpool.

For example, if a V2X UE performs a handover procedure (or registration procedure) on a serving network using the existing IMSI, the V2X UE may obtain information on a ticket and information on a PMSI subpool from the MNO and PCA of the serving network.

In this case, an LEA located in an area supported by the serving network may perform LI as in a home network. That is, the LEA may perform an LI procedure without the help of a home network although a V2X UE is located in the serving network.

Third Embodiment

However, in the case of the second embodiment, the IMSI of a V2X UE may be transmitted through a radio interface when the V2X UE performs handover or a roaming procedure to a serving network. That is, when the V2X UE performs an additional procedure on the serving network directly using identification information, the identification information of the V2X UE may be exposed to a radio interface. In this case, as described above, information, such as the moving speed, direction, etc. of the V2X UE, may be exposed. The corresponding information may be used for a malicious purpose.

By considering this point, a method of supporting an LI procedure in a serving network while identification information (i.e., IMSI) of a V2X UE is not exposed to a radio interface needs to be considered.

In the present embodiment, in order to prevent the use of an IMSI, a method of using a ticket may be considered. In this case, the ticket may be the same or similar to the above-described ticket (e.g., the ticket in FIG. 12), and may have a form such as a false name or a certificate.

For convenience of description, in the present embodiment, a ticket provided by a home network for a PMSI subpool(s) may be referred to as a V2X ticket. Furthermore, as described above, a serving network may also be referred to as a visited network.

Specifically, the V2X UE may transmit, to a serving network (e.g., the MME of the serving network), the V2X ticket instead of a GUTI or an IMSI. That is, the V2X UE may transmit, to the serving network, the ticket (previously) provided by the home network (e.g., the MME of the home network in order to request the issue of a new ticket from the serving network.

In this case, the new ticket may mean a ticket used by the V2X UE to protect identification information (e.g., IMSI) of the corresponding V2X UE in the serving network. That is, the new ticket means a ticket required for the V2X UE to request information on a PMSI subpool from a PCA affiliated with the serving network, and may also be referred to as a new V2X ticket.

Furthermore, the request includes information (home network information) on the home network (e.g., identification information of the MME of the home network).

The home network that has received such a request from the serving network may discover (or identify) an IMSI(s) for the corresponding V2X ticket. The home network may respond (or deliver) the discovered IMSI and authentication data to the serving network.

Thereafter, the serving network may provide the V2X UE with a new V2X ticket. That is, the serving network may transmit, to the V2X UE, a new V2X ticket determined (or selected) based on the IMSI received from the home network. In this case, the corresponding V2X UE may request information on the PMSI subpool from the PCA of the serving network.

An LEA located in the serving network may perform LI on the target V2X UE, as in the home network, based on the PMSI(s) and ticket obtained based on the above-described procedures. That is, the LEA may perform an LI procedure without the help of a home network although the V2X UE is located in the serving network.

FIG. 14 shows another example of a procedure for supporting LI according to an embodiment proposed in the disclosure. FIG. 14 is merely for convenience of description, and does not restrict the scope of the disclosure.

Referring to FIG. 14, a case where a V2X UE 1402 roams from a home network 1406 to a serving network 1404 is assumed. In FIG. 14, the home network 1406 may mean an MME supporting the home network, and the serving network 1404 may mean an MME (e.g., (newly) visited MME) supporting the serving network.

At step S1405, the V2X UE may request a new V2X ticket from the serving network. In this case, for the request, the V2X UE may transmit, to the serving network, a V2X ticket used in the home network. The corresponding V2X ticket may be encrypted using K_PERIOD_OLD. In this case, K_PERIOD_OLD may mean K_PERIOD given (or used) in the home network of the V2X UE prior to roaming.

In this case, the request at step S1405 may be a request toward the home network. Furthermore, the corresponding request may include information (e.g., mobile country code (MCC), mobile network code (MNC), public land mobile network (PLMN)) on the home network. That is, the corresponding request may include identification information or operator identification information for the home network.

At step S1410, the serving network may transmit the received V2X ticket to the home network. In this case, a case where V2X roaming has been agreed (i.e., V2X roaming agreement has been made) between the home network and the serving network is assumed.

At step S1415, the home network may confirm subscription information of the V2X UE using the received V2X ticket. In this case, in order to confirm the subscription information, the home network may decrypt (or recover) the encrypted V2X ticket using K_PERIOD_OLD. In this case, the home network may first confirm the validity of the V2X ticket before confirming the subscription information.

At step S1420, the home network may transmit, to the serving network, IMSI information of the corresponding V2X UE based on the subscription information confirmed with respect to the V2X UE. In this case, the home network may transmit authentication data for the corresponding user equipment in addition to the IMSI information. Accordingly, the serving network may obtain the IMSI information of the corresponding V2X UE without a transmission procedure on a radio interface.

At step S1425, the serving network may transmit a new V2X ticket and K_PERIOD to the V2X UE. In this case, unlike K_PERIOD_OLD, K_PERIOD may mean a cryptographic key shared between an entity(s) of the serving network and the V2X UE for the protection of (PMSI, K_PMSI) pairs.

Through the encryption of a ticket (i.e., V2X ticket, new V2X ticket), such as that described above, a danger of a loss of a ticket attributable to a fake serving network can be prevented.

After the procedures shown in FIG. 14 are performed, the V2X user equipment may request information on a PMSI subpool(s) from the PCA of a visited area using the new V2X ticket received at step S1425. In this case, the visited area may mean an area in which service by the serving network that the user equipment has roamed is supported.

Furthermore, the LEA may perform, even in the visited area, an LI procedure of requesting the PMSI subpool(s) and ticket of a target V2X UE having an IMSI, as in the home network, without the support of the home network for a V2X UE. That is, after the procedures described in the present embodiment are performed, an LI procedure (e.g., the procedure described in the first embodiment) in the serving network may be configured to be performed.

Furthermore, for service continuity in a boundary area, a network that has made a roaming agreement may accommodate a PMSI(s) from a plurality of PCAs. A V2X UE may request a new PMSI(s) from a newly serving network and a PCA affiliated with the newly serving network.

Through the method proposed in the present embodiment, there are advantages in that an LI procedure in a serving network can be performed as in a home network and the IMSI of a V2X UE can be prevented from being transmitted on a radio interface in order to be provided with V2X service.

Fourth Embodiment

As described above in the previous embodiment, in order to prevent the exposure of a V2X ticket, a configuration method of encrypting the V2X ticket using a specific cryptographic key (e.g., K_PERIOD_OLD) and decoding and using the V2X ticket in a home network may be considered.

Furthermore, in order to precisely confirm an IMSI (i.e., confirm the validity of the IMSI), that is, information importantly handled in an LI procedure, a serving network may be configured to additionally perform a procedure of comparing an IMSI, received from a V2X UE, with an IMSI received from a home network. An example considered in such a procedure may be the same as FIG. 15.

FIG. 15 shows yet another example of a procedure for LI according to an embodiment proposed in the disclosure. FIG. 15 is merely for convenience of description, and does not restrict the scope of the disclosure.

Referring to FIG. 15, a case where a V2X UE 1502 roams from a home network 1506 to a serving network 1504 is assumed. In FIG. 15, the home network 1506 may mean an MME supporting the home network, and the serving network 1501 may mean an MME (e.g., (newly) visited MME) supporting the serving network.

Furthermore, some steps in FIG. 15 may be the same or similar to the steps described in FIG. 14. Specifically, steps added or changed compared to the steps of FIG. 14 in order for the serving network to confirm an IMSI (i.e., confirm the validity of the IMSI) correspond to steps S1520, S1525, S1530, S1535 and S1540.

That is, steps S1505 to S1515 are the same or similar to steps S1405 to S1415 in FIG. 14, and step S1425 step is the same or similar to step S1545, and a redundant description is omitted.

At step S1520, the home network that has received the V2X ticket of the V2X UE through steps S1505 to S1515 may transmit the IMSI of the V2X UE, K_VISITED and/or encrypted K_VISITED to the serving network.

In this case, K_VISITED may mean a cryptographic key for confirming an IMSI between the V2X UE and the serving network. In this case, K_VISITED is a symmetric cryptographic key generated by the home network of the V2X UE, and may be distributed to the V2X UE and the serving network. Furthermore, the encrypted K_VISITED may mean K_VISITED encrypted using K_PERIOD_OLD (or a cryptographic key shared by the V2X UE and the home network).

At step S1525, the serving network may transmit the encrypted K_VISITED to the V2X UE.

At step S1530, the V2X UE may decrypt the encrypted K_VISITED using K_PERIOD_OLD (or the cryptographic key shared by the V2X UE and the home network). In this case, a case where K_PERIOD_OLD has been shared between the home network and the V2X UE is assumed. Thereafter, at step S1535, the V2X UE may encrypt an IMSI using the decrypted and obtained K_VISITED, and may transmit the encrypted IMSI to the serving network.

At step S1540, the serving network may determine whether the IMSI received from the home network (i.e., IMSI received at step S1520) is the same as the IMSI received from the V2X UE (i.e., IMSI received at step S1535) by comparing the IMSI received from the home network with the IMSI received from the V2X UE. In this case, the serving network may decrypt the encrypted IMSI, received from the V2X UE, using K_VISITED, and may compare the IMSI received from the home network with the IMSI received from the V2X UE.

If it is determined that the IMSIs received from the home network and the V2X UE are the same (i.e., identical), at step S1545, the serving network may transmit a new V2X ticket and K_PERIOD to the V2X UE.

If it is determined that the IMSIs received from the home network and the V2X UE are not the same (i.e., not identical), the serving network may not transmit a new V2X ticket and K_PERIOD, and may request the retransmission of an IMSI from the V2X UE and/or the home network.

Thereafter, as described in FIG. 14, the V2X user equipment may request information on a PMSI subpool(s) from the PCA of a visited area. The LEA may perform, even in the visited area, an LI procedure of requesting a PMSI subpool (s) and ticket of a target V2X UE having an IMSI without the support of a home network for the V2X UE.

Through the above-described procedure, there are advantages in that a serving network may determine whether IMSIs received from a home network and a V2X UE are accurate information and reliability and accuracy of an LI procedure to be performed in a serving network can be improved.

FIG. 16 shows an example of a flowchart for a method of preventing the exposure of the identifier of a user equipment and supporting an LI procedure according to an embodiment of the disclosure. FIG. 16 is merely for convenience of description, and does not restrict the scope of the disclosure.

Referring to FIG. 16, in this flowchart, the identifier of a user equipment (i.e., V2X UE) may indicate a PMSI assigned to a corresponding user equipment for V2X communication network access. Identification information of the user equipment may indicate an IMSI, that is, a unique identifier of a corresponding user equipment. Furthermore, this flowchart may be an operational flowchart in a serving network, that is, the MME of a serving network, in the above-described embodiments.

The description of the embodiments above described in relation to this flowchart may be applied identically or similarly, and a redundant description thereof is omitted.

First, at step S1605, the MME of the serving network may receive, from the user equipment, a message to request a first ticket that authenticates access authorization for an identifier in the serving network of the user equipment. In this case, the corresponding message may include information on a second ticket that authenticates access authorization for the identifier in the home network of the user equipment. In this case, the first ticket and the second ticket may correspond to the new V2X ticket and V2X ticket in the third embodiment and the fourth embodiment, respectively.

In this case, the information on the second ticket may be encrypted using a temporary key (e.g., the above-described K_PERIOD_OLD) used to encrypt the identifier in the home network. Furthermore, as described above, the corresponding message may further include operator identification information for the home network.

Next, at step S1610, the MME of the serving network may transmit the received information on the second ticket to the MME of the home network. Accordingly, the MME of the home network may confirm (or identify) subscription information, that is, identification information for the corresponding V2X UE.

Next, at step S1615, the MME of the serving network may receive identification information of the user equipment determined based on the information on the second ticket received from the MME of the home network. In this case, in order to additionally confirm the validity of the identification information of the corresponding user equipment, a specific cryptographic key (e.g., the above-described K_VISITED) and a specific cryptographic key (e.g., the above-described encrypted K_VISITED) (i.e., a specific cryptographic key) encrypted using a temporary key used to encrypt the identifier in the home network may be transmitted together.

Furthermore, as described above, a procedure of confirming the validity of the identification information of the user equipment received from the home network may be additionally performed. Specifically, the MME of the serving network may receive, from the MME of the home network, the specific cryptographic key and information (i.e., specific cryptographic key information) of the specific cryptographic key encrypted using the temporary key used to encrypt the identifier in the home network. Thereafter, the MME of the serving network may transmit, to the user equipment, the specific cryptographic key information, and may receive, from the user equipment, the identification information of the user equipment encrypted using the specific cryptographic key. Thereafter, the MME of the serving network may determine whether the identification information received from the user equipment and the identification information received from the MME of the home network are the same. A detailed description related to this is the same as that described in relation to FIG. 15.

Next at step, S1620, the MME of the serving network may transmit, to the user equipment, information on the first ticket and a temporary key used to encrypt the identifier in the serving network based on the received identification information.

Accordingly, the user equipment or the LEA of the serving network may request a subpool (e.g., PMSI subpool) for the identifier of the user equipment from the PCA of the serving network using the first ticket and the temporary key. That is, the above-described lawful interception procedure (e.g., the procedure described in FIG. 13) may be performed in the serving network without the help of a home network. In this case, the LEA may be an entity that performs lawful interception on the user equipment based on the identifier of the corresponding user equipment in the serving network, which has been obtained using the first ticket and the temporary key.

Overview of Devices to which Disclosure may be Applied

FIG. 17 illustrates a block diagram of a communication apparatus according to an embodiment of the disclosure.

Referring to FIG. 17, a wireless communication system includes a network node 1710 and multiple user equipments 1720.

The network node 1710 includes a processor 1711, a memory 1712, and a communication module 1713. The processor 1711 implements a function, a process and/or a method proposed in FIGS. 1 to 16. The layers of a wired/wireless interface protocol may be implemented by the processor 1711. The memory 1712 is connected to the processor 1711 and stores various pieces of information for driving the processor 1711. The communication module 1713 is connected to the processor 1711 and transmits and/or receives a radio signal. An example of the network node 1710 may correspond to a base station, MME, HSS, SGW, PGW, SCEF, SCS/AS, etc. In particular, if the network node 1710 is a base station, the communication module 1713 may include a radio frequency (RF) unit for transmitting/receiving a radio signal.

The UE 1720 includes a processor 1721, a memory 1722, and a communication module (or RF unit) 1723. The processor 1721 implements a function, a process and/or a method proposed in FIGS. 1 to 15. The layers of a wireless interface protocol may be implemented by the processor 1721. The memory 1722 is connected to the processor 1721 and stores various pieces of information for driving the processor 1721. The communication module 1723 is connected to the processor 1721 and transmits and/or receives a radio signal.

The memories 1712 and 1722 may be positioned inside or outside the processors 1711 and 1721 and connected to the processors 1711 and 1721 by various well-known means. Further, the network node 1710 (if the network node 1710 is a base station) and/or the UE 1720 may have a single antenna or multiple antennas.

FIG. 18 illustrates a block diagram of a communication apparatus according to an embodiment of the disclosure.

In particular, FIG. 18 is a diagram more specifically illustrating the UE of FIG. 16 above.

Referring to FIG. 18, the UE may be configured to include a processor (or a digital signal processor (DSP)) 1810, a radio frequency module (or RF unit) 1835, a power management module 1805, an antenna 1840, a battery 1855, a display 1815, a keypad 1820, a memory 1830, a subscriber identification module (SIM) card 1825 (this is optional), a speaker 1845, and a microphone 1850. The UE may also include a single antenna or multiple antennas.

The processor 1810 implements a function, a process, and/or a method proposed in FIGS. 1 to 16. The layers of a wireless interface protocol may be implemented by the processor 1810.

The memory 1830 is connected to the processor 1810 and stores information related to an operation of the processor 1810. The memory 1830 may be positioned inside or outside the processor 1810 and connected to the processor 1810 by various well-known means.

A user inputs command information, such as a telephone number by pressing (or touching) a button on the keypad 1820 or by voice activation using the microphone 1850, for example. The processor 1810 receives such command information and processes to perform appropriate functions including dialing a telephone number. Operational data may be extracted from the SIM card 1825 or the memory 1830. In addition, the processor 1810 may display command information or drive information on the display 1815 for the user to recognize and for convenience.

The RF module 1835 is connected to the processor 1810 to transmit and/or receive an RF signal. The processor 1810 transfers the command information to the RF module 1835 to initiate communication, for example, to transmit radio signals constituting voice communication data. The RF module 1835 is constituted by a receiver and a transmitter for receiving and transmitting the radio signals. The antenna 1840 functions to transmit and receive the radio signals. Upon receiving the radio signals, the RF module 1835 may transfer the signal for processing by the processor 1810 and convert the signal to a baseband. The processed signal may be converted into to audible or readable information output via the speaker 1845.

The aforementioned embodiments are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the disclosure may be achieved by various means, for example, hardware, firmware, software, or a combination thereof. In a hardware configuration, the methods according to the embodiments of the disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

Industrial Applicability

The disclosure is applied to a 3GPP LTE/LTE-A system is primarily described, but can be applied to various wireless communication systems such as New RAT (NR) system in addition to the 3GPP LTE/LTE-A system.

The invention claimed is:

1. A method of securing an identifier of a user equipment used upon accessing a network in a wireless communication system, the method comprising:
    receiving, from the user equipment, a message to request a first ticket that authenticates access authorization to the identifier in a serving network of the user equipment, the message comprising information for a second ticket to authenticate the access authorization to the identifier in a home network of the user equipment,
    transmitting, to a mobility management entity (MME) of the home network, the information on the second ticket,
    receiving, from the MME of the home network, identification information of the user equipment determined based on the information on the second ticket, and
    transmitting, to the user equipment, the first ticket and information on a temporary key used to encrypt the identifier in the serving network based on the identification information,
    wherein the identifier is a pseudonymous mobile subscriber ID (PMSI) assigned to the user equipment for vehicle to anything (V2X) communication network access, and
    wherein the identification information is an international mobile subscriber ID (IMSI) assigned to the user equipment for the V2X communication network access.

2. The method of claim 1, wherein the message further comprises operator identification information for the home network.

3. The method of claim 1, wherein the information on the second ticket is encrypted using a temporary key used to encrypt the identifier in the home network.

4. The method of claim 1, further comprising:
    confirming a validity of the identification information using a specific cryptographic key used to confirm the validity of the identification information.

5. The method of claim 4,
wherein confirming the validity of the identification information comprises:
receiving, from the MME of the home network, the specific cryptographic key and specific cryptographic key information encrypted from the specific cryptographic key using a temporary key used to encrypt the identifier in the home network,
transmitting the specific cryptographic key information to the user equipment,
receiving, from the user equipment, the identification information of the user equipment encrypted using the specific cryptographic key, and
confirming whether identification information of the user equipment received from the user equipment is identical with the identification information of the user equipment received from the MME of the home network.

6. The method of claim 4,
wherein the specific cryptographic key is generated by the home network.

7. The method of claim 5, further comprising:
transmitting, to at least one of to the user equipment or the MME of the home network, a message to request a retransmission of the identification information of the user equipment based on the identification information of the user equipment received from the user equipment not being identical to the identification information of the user equipment received from the MME of the home network.

8. The method of claim 1, wherein the serving network is a network roamed by the user equipment from the home network.

9. The method of claim 1, wherein the first ticket and the information on the temporary key are information which is used for the user equipment or a lawful enforcement agency (LEA) of the serving network to request a subpool for the identifier from a pseudonym certification authority (PCA) of the serving network.

10. The method of claim 9,
wherein the LEA of the serving network is an entity performing lawful interception (LI) on the user equipment based on the identifier of the user equipment obtained using the first ticket and the temporary key in the serving network.

11. A mobility management entity (MME) for protecting an identifier of a user equipment used upon accessing a network in a wireless communication system, the MME comprising:
a transceiver for transmitting and receiving signals, and
a processor configured to control the transceiver,
wherein the processor is configured to:
receive, from the user equipment, a message to request a first ticket that authenticates access authorization to the identifier in a serving network of the user equipment, the message comprising information on a second ticket to authenticate the access authorization to the identifier in a home network of the user equipment,
transmit, to a mobility management entity (MME) of the home network, the information on the second ticket,
receive, from the MME of the home network, identification information of the user equipment determined based on the information on the second ticket, and
transmit, to the user equipment, the first ticket and information on a temporary key used to encrypt the identifier in the serving network based on the identification information,
wherein the identifier is a pseudonymous mobile subscriber ID (PMSI) assigned to the user equipment for vehicle to anything (V2X) communication network access, and
wherein the identification information is an international mobile subscriber ID (IMSI) assigned to the user equipment for the V2X communication network access.

12. The MME of claim 11, wherein the processor is configured to confirm a validity of the identification information using a specific cryptographic key used to confirm the validity of the identification information.

13. The MME of claim 12, wherein the processor is configured to:
based on the processor confirming the validity of the identification information, receive, from the MME of the home network, the specific cryptographic key and specific cryptographic key information obtained by encrypting the specific cryptographic key using a temporary key used to encrypt the identifier in the home network,
transmit the specific cryptographic key information to the user equipment,
receive, from the user equipment, the identification information of the user equipment encrypted using the specific cryptographic key, and
confirm whether the identification information of the user equipment received from the user equipment is identical with the identification information of the user equipment received from the MME of the home network.

* * * * *